US006228903B1

(12) United States Patent
Beall et al.

(10) Patent No.: US 6,228,903 B1
(45) Date of Patent: May 8, 2001

(54) EXFOLIATED LAYERED MATERIALS AND NANOCOMPOSITES COMPRISING SAID EXFOLIATED LAYERED MATERIALS HAVING WATER-INSOLUBLE OLIGOMERS OR POLYMERS ADHERED THERETO

(75) Inventors: Gary W. Beall, McHenry; Fernando Serrano, Chicago; Hannah Cruz, Glendale Heights, all of IL (US)

(73) Assignee: AMCOL International Corporation, Arlington Heights, IL (US)

( * ) Notice: Subject to any disclaimer, the term of this patent is extended or adjusted under 35 U.S.C. 154(b) by 0 days.

(21) Appl. No.: 09/283,954

(22) Filed: Apr. 1, 1999

Related U.S. Application Data

(63) Continuation of application No. 08/691,689, filed on Aug. 2, 1996, now abandoned, which is a continuation-in-part of application No. 08/488,263, filed on Jun. 7, 1995, now Pat. No. 5,698,624.

(51) Int. Cl.$^7$ .............................. C08K 9/04; C08K 9/12; C08K 3/34
(52) U.S. Cl. ..................... 523/209; 523/216; 524/444; 524/446; 427/221
(58) Field of Search .................... 523/209, 216; 524/444, 446; 427/221

(56) References Cited

U.S. PATENT DOCUMENTS

| | | | |
|---|---|---|---|
| 2,035,546 | 3/1936 | Hamilton ................... | 167/24 |
| 3,419,460 | 12/1968 | Ure .......................... | 161/162 |
| 3,419,517 | 12/1968 | Hedrick et al. ............ | 260/37 |
| 3,515,626 | 6/1970 | Duffield ..................... | 161/162 |
| 3,773,708 | 11/1973 | Takahashi et al. ........ | 260/41 R |
| 3,795,650 | 3/1974 | Burns ........................ | 260/33.4 R |
| 3,912,532 | 10/1975 | Simone ...................... | 106/308 N |
| 3,929,678 | 12/1975 | Laughlin et al. .......... | 252/526 |
| 3,929,849 | 12/1975 | Oswald ....................... | 260/448 |
| 4,053,493 | 10/1977 | Oswald ....................... | 260/448 |
| 4,125,411 | 11/1978 | Lyons ......................... | 106/291 |
| 4,136,103 | 1/1979 | Oswald ....................... | 260/448 |
| 4,210,572 | 7/1980 | Herman et al. ............ | 260/404 |
| 4,251,576 | 2/1981 | Osborn et al. ............. | 428/331 |
| 4,400,485 | 8/1983 | Mukamal et al. ......... | 524/444 |
| 4,431,755 | 2/1984 | Weber et al. .............. | 523/203 |
| 4,434,075 | 2/1984 | Mardis et al. ............. | 252/315.2 |
| 4,472,538 | 9/1984 | Kamigaito et al. ........ | 523/202 |
| 4,500,670 | 2/1985 | Mckinley et al. ......... | 524/445 |
| 4,546,145 | 10/1985 | Kishida et al. ............ | 524/780 |
| 4,600,744 | 7/1986 | Libor et al. ................ | 524/446 |
| 4,613,542 | 9/1986 | Alexander ................. | 428/290 |
| 4,624,982 | 11/1986 | Alexander ................. | 524/446 |
| 4,739,007 | 4/1988 | Okada et al. .............. | 524/789 |
| 4,789,403 | 12/1988 | Rice ........................... | 106/417 |
| 4,798,766 | 1/1989 | Rice ........................... | 428/404 |
| 4,810,734 | 3/1989 | Kawasumi et al. ........ | 523/216 |
| 4,842,651 | 6/1989 | Ravet et al. ............... | 106/487 |
| 4,849,006 | 7/1989 | Knudson, Jr. ............. | 71/64.11 |
| 4,851,021 | 7/1989 | Bohrn et al. .............. | 65/17 |
| 4,875,762 | 10/1989 | Kato et al. ................. | 350/357 |
| 4,889,885 | 12/1989 | Usuki et al. ............... | 524/443 |

(List continued on next page.)

FOREIGN PATENT DOCUMENTS

| | | |
|---|---|---|
| 281 585 A5 | 8/1990 | (DE) . |
| 0 205 281 A3 | 12/1986 | (EP) . |
| 0 335 653 A1 | 10/1989 | (EP) . |
| 0 358 415 A1 | 3/1990 | (EP) . |
| 0 479 031 A1 | 4/1992 | (EP) . |
| 0 548 940 A1 | 6/1993 | (EP) . |
| 0 619 182 A1 | 10/1994 | (EP) . |
| 0 645 181 S2 | 3/1995 | (EP) . |
| 0 747 451 A2 | 12/1996 | (EP) . |
| 0 761 739 A1 | 3/1997 | (EP) . |
| 0 780 340 A1 | 6/1997 | (EP) . |
| 1 146 668 | 3/1969 | (GB) . |
| 1 642 122 | 7/1970 | (GB) . |
| 1 565 362 | 4/1980 | (GB) . |
| 2 088 932 | 6/1982 | (GB) . |
| WO 93/04117 | 3/1993 | (WO) . |
| WO 93/04118 | 3/1993 | (WO) . |
| WO 93/11190 | 6/1993 | (WO) . |
| WO 96/08526 | 3/1996 | (WO) . |

OTHER PUBLICATIONS

C. W. Francis, "Adsorption of Polyvinylpyrrolidone on Reference Clay Minerals", Soil Science, vol. 115, No. 1, 1973, pp. 40–54.

A. Usuki, et al., "Synthesis of nylon 6–clay hybrid", J. Mater. Res., vol. 8, No. 5, May 1993, pp. 1179–1184.

Y. Kojima, et al., "Mechanical Properties Of Nylon 6–Clay Hybrid", J. Mater. Res., vol. 8, No. 5, May 1993, pp. 1185–1189.

(List continued on next page.)

Primary Examiner—Tae H. Yoon
(74) Attorney, Agent, or Firm—Marshall, O 'Toole, Gerstein, Murray & Borun

(57) ABSTRACT

A phyllosilicate material is exfoliated by admixture of the phyllosilicate with water, and a solvent for a water-insoluble oligomer or polymer that is sorbed or electrostatically bonded to the inner surfaces of the phyllosilicate platelets after exfoliation of the phyllosilicate. Intercalation and exfoliation can be achieved via contact of the phyllosilicate with an organic solvent and water to electrostatically bond one or more polar moieties from the organic solvent to a metal cation on the platelet inner surfaces, so that after evaporation of the water used for intercalation of the organic solvent between phyllosilicate platelets, the platelets do not then collapse together, but remain exfoliated. After exfoliation of the phyllosilicate, the exfoliated platelets are contacted with a polymer/carrier composition that includes a water-insoluble polymer or water-insoluble oligomer, and a solvent for the water-insoluble polymer or oligomer. After exfoliating the phyllosilicate and prior to polymer contact, the individual phyllosilicate platelets are contacted with the polymer/carrier composition to sorb the water-insoluble polymer or water-insoluble oligomer onto one or both surfaces of the exfoliated phyllosilicate platelets and drive off the adhered solvent.

34 Claims, 7 Drawing Sheets

U.S. PATENT DOCUMENTS

| | | | |
|---|---|---|---|
| 4,894,411 | 1/1990 | Okada et al. | 524/710 |
| 4,920,171 | 4/1990 | Hutton, Jr. et al. | 524/446 |
| 4,956,121 | 9/1990 | Tymon et al. | 252/378 R |
| 5,028,351 | 7/1991 | Kato et al. | 252/315.2 |
| 5,032,546 | 7/1991 | Giannelis et al. | 501/3 |
| 5,032,547 | 7/1991 | Giannelis et al. | 501/3 |
| 5,091,462 | 2/1992 | Fukui et al. | 524/504 |
| 5,102,948 | 4/1992 | Deguchi et al. | 524/789 |
| 5,164,440 | 11/1992 | Deguchi et al. | 524/444 |
| 5,164,460 | 11/1992 | Yano et al. | 624/445 |
| 5,204,078 | 4/1993 | Tateyama et al. | 423/331 |
| 5,206,284 | 4/1993 | Fukui et al. | 524/504 |
| 5,229,451 | 7/1993 | Carter et al. | 524/493 |
| 5,248,720 | 9/1993 | Deguchi et al. | 524/444 |
| 5,326,500 | 7/1994 | Friedman et al. | 252/378 |
| 5,340,558 | 8/1994 | Friedman et al. | 423/328.1 |
| 5,385,776 | 1/1995 | Maxfield et al. | 428/297 |
| 5,391,437 | 2/1995 | Miyasaka et al. | 528/425.5 |
| 5,414,042 | 5/1995 | Yasue et al. | 524/789 |
| 5,428,094 | 6/1995 | Tokoh et al. | 524/379 |
| 5,506,046 | 4/1996 | Andersen et al. | 524/446 |
| 5,508,072 | 4/1996 | Andersen et al. | 524/446 |
| 5,514,734 | 5/1996 | Maxfield et al. | 523/204 |
| 5,552,469 | 9/1996 | Beall et al. | 524/445 |
| 5,578,672 | 11/1996 | Beall et al. | 624/446 |
| 5,659,034 | 8/1997 | DeBord et al. | 546/2 |
| 5,667,886 | 9/1997 | Gough et al. | 428/331 |
| 5,698,624 | 12/1997 | Beall et al. | 524/445 |
| 5,721,306 | 2/1998 | Tsipursky et al. | 524/449 |
| 5,730,996 | 3/1998 | Beall et al. | 424/405 |
| 5,747,403 | 5/1998 | Boyd et al. | 502/62 |
| 5,747,560 | 5/1998 | Christiani et al. | 523/209 |
| 5,760,106 | 6/1998 | Pinnavaia et al. | 523/209 |
| 5,760,121 | 6/1998 | Beall et al. | 524/450 |
| 5,801,216 | 9/1998 | Pinnavaia et al. | 523/209 |
| 5,804,613 | 9/1998 | Beall et al. | 523/200 |
| 5,830,528 | 11/1998 | Beall et al. | 427/220 |
| 5,837,763 | 11/1998 | Ferraro et al. | 524/449 |
| 5,844,032 | 12/1998 | Serrano et al. | 524/445 |
| 5,849,830 | 12/1998 | Tsipursky et al. | 524/450 |
| 5,877,248 | 3/1999 | Beall et al. | 524/450 |
| 5,880,197 | 3/1999 | Beall et al. | 524/445 |
| 5,910,523 | 6/1999 | Hudson | 523/213 |
| 5,981,029 | 11/1999 | Harada et al. | 428/143 |
| 5,994,445 | 11/1999 | Kaschel et al. | 524/444 |
| 6,071,988 | 6/2000 | Barbee et al. | 523/210 |
| 6,084,019 | 7/2000 | Matayabas, Jr. et al. | 524/445 |

OTHER PUBLICATIONS

K. Suzuki, et al., "Preparation Of Delaminated Clay Having A Narrow Micropore Distribution In The Presence Of Hydroxyaluminum Cations And Polyvinyl Alcohol", Clays and Clay Minerals, vol. 36, No. 2, 1988, pp. 147–152.

R. Levy, et al., "Interlayer Adsorption of Polyvinylpyrrolidone On Montmorillonite", Journal of Colloid and Interface Science, vol. 50, No. 3, Mar. 1975, pp. 442–450.

D. J. Greenland, "Adsorption Of Polyvinyl Alcohols By Montmorillonite", Journal of Colloid Science, 18, (1963) pp. 647–664.

R.A. Vaia, et al., "Synthesis and Properties of Two–Dimensional Nanostructures by Direct Intercalation of Polymer Melts in Layered Silicates", Chem. Mater. 1993, 5, pp. 1694–1696.

R.A. Vaia, et al, "New Polymer Electrolyte Nanocomposites: Melt Intercalation of Poly(ethylene oxide) in Mica–Type Silicates", Advanced Materials 1995, 7, No. 2, pp. 154–156.

A. Akelah, et al., "Synthesis and Characterization of Epoxyphilic montmorillonites", Clay Minerals (1994) 29, pp. 169–178.

C.E. Clapp, et al., "Adsorption Studies Of A Dextran On Montmorillonite", Trans. 9th Int. Cong. Soil Sci., 1968, vol. 1, pp. 627–634.

H.G.G. Dekking, "Preparation And Properties Of Some Polymer–Clay Compounds", Clays and Clay Minerals, 1964, 12, pp. 603–616.

A. Usuki, et al., "Characterization and Properties of Nylon 6—Clay Hybrid", (source and date unknown), pp. 651–652.

G.W. Brindley, et al., "Preparation And Solvatio Properties Of Some Variable Charge Montmorillonites", Clays and Clay Minerals, 1971, vol. 18, pp. 399–404.

A. Okada, et al., "A Solid State NMR Study On Crystalline Forms Of Nylon 6", Journal of Applied Polymer Science, (1989), vol. 37, pp. 1363–1371.

A. Usuki, et al., Swelling Behavior Of Montmorillonite Cation Exchanged For ω–Amino Acids By ∈–Caprolactam, J. Mater. Res., vol. 8, No. 5, May 1993, pp. 1174–1178.

Y. Kojima, et al., "One–Pot Synthesis Of Nylon 6–Clay Hybrid", Journal of Polymer Science: Part A: Polymer Chemistry, vol. 31, (1993), pp. 1755–1758.

Y. Kojima, et al., "Fine Structure Of Nylon–6–Clay Hybrid", Journal of Polymer Science: Part B: Polymer Physics, vol. 32 (1994), pp. 625–630.

B.K.G. Theng, "Clay–Polymer interactions: Sumary And Perspectives", Clays and Clay Minerals, vol. 30, No. 1 (1982) pp. 1–9.

Sugahara, et al., "Clay–Organic Nano–Composite; Preparation of a Kaolinite–Poly(vinylpyrrolidone) Intercalation Compound", *Journal of the Ceramic Society of Japan*, International Edition, vol. 100, No. 4, Apr. 1, 1992, pp. 420–423.

Ogawa et al., "Preparation Of Montmorillonite–Polyacrylamide Intercalation Compounds And The Water Absorbing Property", Clay Science, vol. 7, 1989 Tokyo, Japan, pp. 243–251.

Wu, et al., "Structural, thermal, and electrical characterization of layered nanocomposites derived from sodium–montmorillonite and polyethers", Chemical Abstracts, vol. 119, No. 4, Jul. 26, 1993 Columbus, Ohio, US, Abstract No. 31017r.

Bujdak, et al., "The reaction of montmorillonite with octadecylamine in solid and melted state", Chemical Abstracts, vol. 118, No. 26, Abstract No. 257609b, p. 166 (Jun. 28, 1993), Columbus, Ohio (US).

Sanchez Camazano, M. et al., "Factors influencing interactions of organophosphorus pesticides with montmorillonite", Chemical Abstracts, vol. 98, No. 19, May 9, 1983, Columbus, Ohio, US, Abstract No. 156367.

T. Lan, et al., "Clay–Epoxy Nanocomposites:Relationships Between Reinforcement Properties And The Extent Of Clay Layer Exfoliation", *Polym. Mater. Sc. Eng.*, 73, pp. 296–297 (1995).

Yano, et al., "Synthesis And Properties Of Polyimide–Clay Hybrid", Polymer Preprints, ACS, Apr. 1991, pp. 65–66.

Giannelis, et al., "Synthesis And Processing Of Ceramics: Scientific Issues", Materials Research Society Symposium Proceedings, vol. 249 (1992), pp. 547–558.

FIG. 1
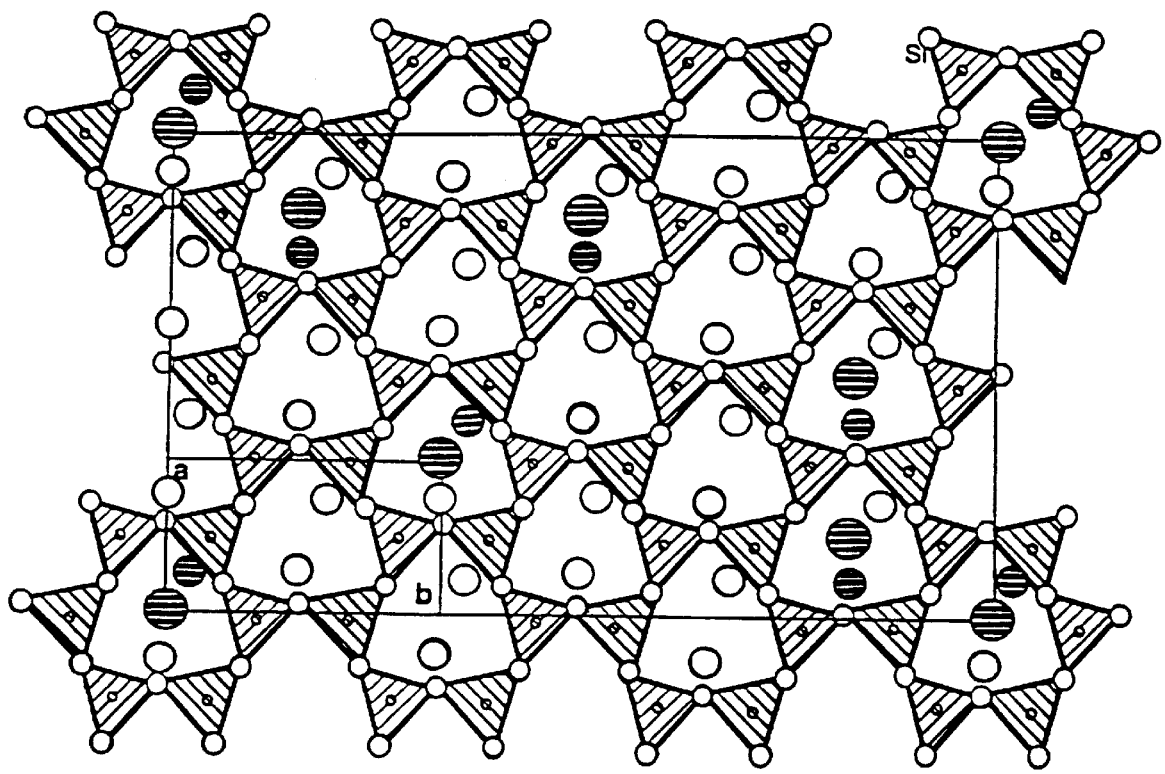
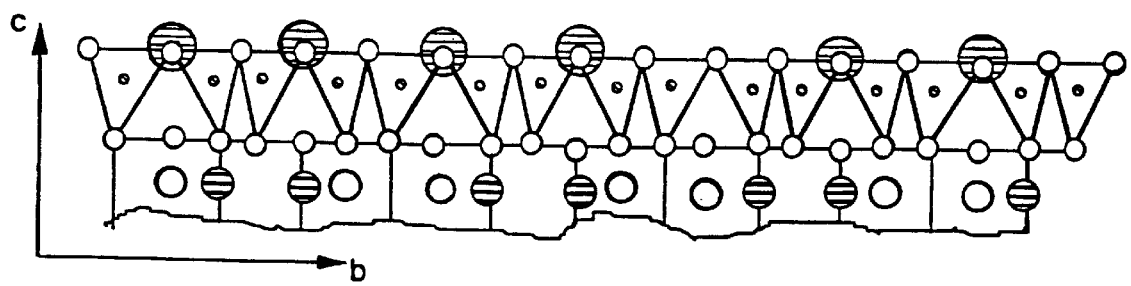
FIG. 2
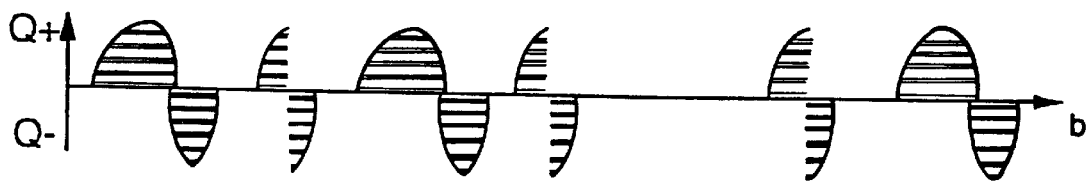
FIG. 3

EXFOLIATED LAYERED MATERIALS AND NANOCOMPOSITES COMPRISING SAID EXFOLIATED LAYERED MATERIALS HAVING WATER-INSOLUBLE OLIGOMERS OR POLYMERS ADHERED THERETO

CROSS-REFERENCE TO RELATED APPLICATION

This application is a continuation of application Ser. No. 08/691,689 filed Aug. 2, 1996 now abandoned which is a continuation-in-part of application Ser. No. 08/488,263 filed Jun. 7, 1995, now U.S. Pat. No. 5,698,624.

FIELD OF THE INVENTION

The present invention is directed to exfoliated layered materials manufactured by sorption (adsorption and/or absorption) of one or more water-insoluble oligomers or polymers onto exfoliated platelets of a water-swellable layered material, such as a phyllosilicate or other layered material. More particularly, the present invention is directed to exfoliated phyllosilicate platelets having at least one layer of oligomer and/or polymer molecules sorbed on the external surface of exfoliated planar platelets of a layered material, such as a phyllosilicate, preferably a smectite clay. The resulting polymer or oligomer/platelets are neither entirely organophilic nor entirely hydrophilic, but a combination of the two. The polymer or oligomer is held to the phyllosilicate platelets by an electrostatic bond and can be mixed with a thermoplastic or thermosetting matrix polymer melt, preferably a thermoplastic matrix polymer, to improve one or more properties of the matrix polymer. The resulting matrix polymer/platelet composite materials are useful wherever polymer/filler composite materials are used, for example, as external body parts for the automotive industry; heat-resistant polymeric automotive parts in contact with an engine block; tire cord for radial tires; food wrap having improved gas impermeability; electric components; food grade drink containers; and any other use where it is desired to alter one or more physical properties of a matrix polymer, such as elasticity and temperature characteristics, e.g., glass transition temperature and high temperature resistance.

BACKGROUND OF THE INVENTION AND PRIOR ART

It is well known that phyllosilicates, such as smectite clays, e.g., sodium montmorillonite and calcium montmorillonite, can be treated with organic molecules, such as organic ammonium ions, to intercalate the organic molecules between adjacent, planar silicate layers, thereby substantially increasing the interlayer (interlaminar) spacing between the adjacent silicate layers. The thus-treated, intercalated phyllosilicates, having interlayer spacings of at least about 5 Angstroms, preferably at least about 10–20 Angstroms and up to about 100 Angstroms, then can be exfoliated, e.g., the silicate layers are separated, e.g., mechanically, by high shear mixing. The individual silicate layers, when admixed with a matrix polymer, before, after or during the polymerization of the matrix polymer, e.g., a polyamide—see U.S. Pat. Nos. 4,739,007; 4,810,734; and 5,385,776 —have been found to substantially improve one or more properties of the polymer, such as mechanical strength and/or high temperature characteristics.

Exemplary of such prior art composites, also called "nanocomposites", are disclosed in published PCT disclosure of Allied Signal, Inc. WO 93/04118 and U.S. Pat. No. 5,385,776, disclosing the admixture of individual platelet particles derived from intercalated layered silicate materials, with a polymer to form a polymer matrix having one or more properties of the matrix polymer improved by the addition of the exfoliated intercalate. As disclosed in WO 93/04118, the intercalate is formed (the interlayer spacing between adjacent silicate platelets is increased) by adsorption of a silane coupling agent or an onium cation, such as a quaternary ammonium compound, having a reactive group which is compatible with the matrix polymer. Such quaternary ammonium cations are well known to convert a highly hydrophilic clay, such as sodium or calcium montmorillonite, into an organophilic clay capable of sorbing organic molecules. A publication that discloses direct intercalation (without solvent) of polystyrene and poly (ethylene oxide) in organically modified silicates is Synthesis and Properties of Two-Dimensional Nanostructures by Direct Intercalation of Polymer Melts in Layered Silicates, Richard A. Vaia, et al., *Chem. Mater.*, 5:1694–1696(1993). Also as disclosed in *Adv. Materials*, 7, No. 2: (1985), pp, 154–156, New Polymer Electrolyte Nanocomposites: Melt Intercalation of Poly(Ethylene Oxide) in Mica-Type Silicates, Richard A. Vaia, et al., poly(ethylene oxide) can be intercalated directly into Na-montmorillonite and Li-montmorillonite by heating to 80° C. for 2–6 hours to achieve a d-spacing of 17.7 Å. The intercalation is accompanied by displacing water molecules, disposed between the clay platelets with polymer molecules. Apparently, however, the intercalated material could not be exfoliated and was tested in pellet form. It was quite surprising to one of the authors of these articles that exfoliated material could be manufactured in accordance with the present invention.

Previous attempts have been made to intercalate watersoluble polymers, such as polyvinylpyrrolidone (PVP), polyvinyl alcohol (PVA) and poly(ethylene oxide) (PEO) between montmorillonite clay platelets with little success. As described in Levy, et al., Interlayer Adsorption of Polyvinylpyrrolidone on Montmorillonite, Journal of Colloid and Interface Science, Vol. 50, No. 3, March 1975, pages 442–450, attempts were made to sorb PVP (40,000 average M.W.) between monoionic montmorillonite clay platelets (Na, K, Ca and Mg) by successive washes with absolute ethanol, and then attempting to sorb the PVP by contact with 1% PVP/ethanol/water solutions, with varying amounts of water, via replacing the ethanol solvent molecules that were sorbed in washing (to expand the platelets to about 17.7 Å). Only the sodium montmorillonite had expanded beyond a 20 Å basal spacing (e.g., 26 Å and 32 Å), at $5^{+}\%$ $H_2O$, after contact with the $PVP/ethanol/H_2O$ solution. It was concluded that the ethanol was needed to initially increase the basal spacing for later sorption of PVP, and that water did not directly affect the sorption of PVP between the clay platelets (Table II, page 445), except for sodium montmorillonite. The sorption was time consuming and difficult and met with little success.

Further, as described in Greenland, Adsorption of Polyvinyl Alcohols by Montmorillonite, Journal of Colloid Sciences, Vol. 18, pages 647–664 (1963), polyvinyl alcohols containing 12% residual acetyl groups could increase the basal spacing by only about 10 Å due to the sorbed polyvinyl alcohol (PVOH). As the concentration of polymer in the intercalant polymer-containing solution was increased from 0.25% to 4%, the amount of polymer sorbed was substantially reduced, indicating that sorption might only be effective at polymer concentrations in the intercalant polymer-containing composition on the order of 1% by weight polymer, or less. Such a dilute process for intercalation of polymer into layered materials would be exceptionally costly in drying the intercalated layered materials for separation of intercalate from the polymer carrier, e.g., water, and, therefore, apparently no further work was accomplished toward commercialization.

In accordance with an important feature of the present invention, it has been found that it is best to exfoliate the phyllosilicate prior to contacting the phyllosilicate with a polymer or oligomer, to provide polymer or oligomer-bonded platelets that do not include a substantial quantity of non-exfoliated phyllosilicate clumps or tactoids. Best results are achieved using a water-insoluble oligomer (herein defined as a pre-polymer having 2 to about 15 recurring monomeric units, which can be the same or different) or water-insoluble polymer (herein defined as having more than about 15 recurring monomeric units, which can be the same or different) composition for intercalation having at least about 2%, preferably at least about 5% by weight oligomer or polymer concentration, more preferably about 50% to about 80% by weight oligomer and/or polymer, based on the weight of oligomer and/or polymer and carrier (water and a solvent for the oligomer or polymer) to achieve better sorption of the polymers or oligomers onto the external surfaces of the exfoliated phyllosilicate platelets. The water-insoluble oligomer or polymer is sorbed onto at least one outer surface of the silicate platelets.

A phyllosilicate, such as a smectite clay, can be easily and completely exfoliated by adding water and an organic solvent having a polar functionality, and then shearing the phyllosilicate/water/solvent mixture. After exfoliation, it has been found that a water-insoluble polymer and/or a water-insoluble oligomer can be adhered to the outer surfaces of the exfoliated platelets, so long as the polymer or oligomer has a carbonyl, hydroxyl, carboxyl, amine, amide, ether, ester, sulfate, sulfonate, sulfinate, sulfamate, phosphate, phosphonate, or phosphinate functionality, or an aromatic ring to provide metal cation bonding, via a metal cation of the phyllosilicate sharing electrons with two electronegative atoms of two functional groups of polymer molecules, to the outer surfaces of the exfoliated phyllosilicate platelets. The electronegative atoms can be, for example, oxygen, sulfur, nitrogen, and combinations thereof. Atoms having a sufficient electronegativity to bond to metal cations on the inner surface of the platelets have an electronegativity of at least 2.0, and preferably at least 2.5, on the Pauling Scale. A "polar moiety" or "polar group" is defined as a moiety having two adjacent atoms that are bonded covalently and have a difference in electronegativity of at least 0.5 electronegativity units on the Pauling Scale. Such polymers have sufficient affinity for the phyllosilicate platelets to maintain sufficient interlayer spacing for exfoliation, without the need for coupling agents or spacing agents, such as the onium ion or silane coupling agents disclosed in the above-mentioned prior art. A schematic representation of the charge distribution on the surfaces of a sodium montmorillonite clay is shown in FIGS. 1–3. As shown in FIGS. 2 and 3, the location of surface $Na^+$ cations with respect to the location of oxygen (Ox) Mg, Si and Al atoms (FIGS. 1 and 2) results in a clay surface charge distribution as schematically shown in FIG. 3. The positive-negative charge distribution over the entire clay surface provides for excellent dipole/dipole attraction of the polar moieties of the polymer molecules on the surfaces of the clay platelets.

Sorption and metal cation electrostatic attraction or bonding of a platelet metal cation between two oxygen or nitrogen atoms of the polymer or oligomer molecules; or the electrostatic bonding between the interlayer cations in hexagonal or pseudohexagonal rings of the smectite platelet layers and an oligomer or polymer aromatic ring structure provides tenacious bonding between the polymer or oligomer and the outer surface of the exfoliated silicate platelets or other layered material, while providing individual silicate/polymer nanocomposite material, and without including a substantial quantity of non-exfoliated clumps or tactoids of phyllosilicate material. Phyllosilicates easily can be exfoliated into individual phyllosilicate platelets before admixture with a polymer or oligomer, as well known in the art.

DEFINITIONS

Whenever used in this Specification, the terms set forth shall have the following meanings:

"Layered Material" shall mean an inorganic material, such as a smectite clay mineral, that is in the form of a plurality of adjacent, bound layers and has a maximum thickness, for each layer, of about 100 Å.

"Platelets" shall mean individual layers of the Layered Material.

"Intercalate" or "Intercalated" shall mean a Layered Material that includes water molecules disposed between adjacent platelets of the Layered Material to increase the interlayer spacing between the adjacent platelets to at least 10 Å.

"Intercalation" shall mean a process for forming an Intercalate.

"Intercalating Composition" shall mean a composition comprising water and an organic solvent capable of dissolving a later added, water-insoluble oligomer or polymer.

"Exfoliate" or "Exfoliated" shall mean individual platelets of an Intercalated Layered Material so that adjacent platelets of the Intercalated Layered Material can be dispersed individually for sorption of a water-insoluble polymer or oligomer.

"Exfoliation" shall mean a process for forming an Exfoliate from an Intercalate.

"Nanocomposite" shall mean an oligomer, polymer or copolymer having dispersed therein a plurality of individual platelets obtained from an Exfoliated oligomer-sorbed or polymer-sorbed Layered Material.

"Matrix Polymer" shall mean a thermoplastic or thermosetting polymer in which the oligomer-sorbed or polymer-sorbed Exfoliate is dispersed to form a Nanocomposite.

"Polymer/Carrier Composition" shall mean a composition containing a water-insoluble polymer and/or a water-insoluble oligomer; a solvent capable of solubilizing the polymer and/or oligomer; and water.

"Tactoid" shall mean a packet of two or more platelet layers of intercalated clay acting as a unit.

SUMMARY OF THE INVENTION

In brief, the present invention is directed to exfoliated platelets of a phyllosilicate material that are exfoliated by admixture of the phyllosilicate with water, and a solvent for a water-insoluble oligomer or polymer that is sorbed or electrostatically bonded to the inner surfaces of the phyllosilicate platelets after exfoliation of the phyllosilicate. Intercalation and exfoliation can be achieved via contact of the phyllosilicate with an organic solvent and water to electrostatically bond one or more polar moieties from the organic solvent to a metal cation on the platelet inner surfaces, so that after evaporation of the water used for intercalation of the organic solvent between phyllosilicate platelets, the platelets do not then collapse together, but remain exfoliated. The organic solvent used should be capable of dissolving at least a portion of the later added, water-insoluble polymer; must be capable of intercalating between phyllosilicate platelets sufficiently, together with water, for subsequent exfoliation of the phyllosilicate platelets, with shearing, if necessary; and must be sufficiently electrostatically bonded to the inner surfaces of the exfoliated clay platelets to maintain the platelets in the exfoliated state after dehydration of the exfoliated platelet/solvent/water composition. Suitable solvents include . . . γ-butyrolactone; 2-pyrrolidone; n-methylpyrrolidone; dimethylsulfoxide (DMSO); isophorone; diglyme; caprolactam; furfuryl alcohol; tetrohydrofuran and mixtures thereof.

After exfoliation of the phyllosilicate, the exfoliated platelets are contacted with a polymer/carrier composition that includes a water-insoluble polymer or water-insoluble oligomer, and a solvent for the water-insoluble polymer or oligomer. After exfoliating the phyllosilicate and prior to polymer contact, the individual phyllosilicate platelets are contacted with the polymer/carrier composition to sorb the water-insoluble polymer or water-insoluble oligomer onto one or both surfaces of the exfoliated phyllosilicate platelets and drive off the adhered solvent. Sufficient polymer is sorbed onto the surface(s) of the phyllosilicate platelets to provide at least one molecular layer of polymer or oligomer over at least one exposed platelet surface of each platelet.

The organic solvent sorbed onto the surfaces of the phyllosilicate platelets should have an affinity for the phyllosilicate so that it is sorbed onto, and is maintained associated with the silicate platelet surfaces until the exfoliated platelets are contacted with a water-insoluble polymer melt, in a solvent for the water-insoluble polymer. In accordance with the present invention, the organic solvent should include an aromatic ring and/or have a functionality selected from the group consisting of a carbonyl; carboxyl; hydroxyl; amide; ether; or ester, to be sufficiently bound to the surface of the phyllosilicate platelets. It is hereby theorized that the solvent is bonded to the phyllosilicate platelet inner surface by a mechanism selected from the group consisting of metal cation bonding or complexing, e.g., chelation; ionic complexing; electrostatic complexing; hydrogen bonding; dipole/dipole; Van Der Waals Forces; and any combination thereof, such that a metal cation of a phyllosilicate shares electrons with two carbonyl, two carboxyl, two hydroxyl, two oxygen, two ether, two ester, two aromatic ring and/or two amide functionalities of one or two organic solvent molecules. Such organic solvents have sufficient affinity for the surfaces of the phyllosilicate platelets to maintain sufficiently bound to the surfaces of the phyllosilicate platelets, without the need for coupling agents or spacing agents, such as the onium ion or silane coupling agents disclosed in the above-mentioned prior art.

Sorption of the organic solvent should be sufficient to achieve expansion of adjacent platelets of the layered material (when measured dry) to an interlayer spacing of at least about 5 Å, preferably at least about 10 Å, more preferably a spacing of at least about 20 Å, and most preferably a spacing of about 30–45 Å. To achieve sufficient sorption of the water-insoluble polymer or oligomer onto the basal surface of the exfoliated phyllosilicate platelets, the concentration of organic solvent in the organic solvent/water intercalating composition contacting the phyllosilicate should be at least about 2% by weight, preferably at least about 5%, more preferably at least about 15%, and most preferably at least about 20% organic solvent, for example about 25% to about 100% by weight organic solvent, based on the dry weight of the phyllosilicate contacted by the intercalating composition.

Such intercalation of organic solvent molecules between platelets of a phyllosilicate so that the phyllosilicate can be easily exfoliated, and maintain exfoliation even after water removal. Further, it has been found that more complete exfoliation of the phyllosilicate is achieved if the phyllosilicate is exfoliated prior to polymer or oligomer contact. Such organic solvent-sorbed platelets are especially useful in admixture with matrix thermoplastic or thermosetting polymer melts in the manufacture of polymeric articles containing the exfoliated platelets since the exfoliated platelets, when added to the polymer melt resulting in dehydration of the exfoliated platelets, do not collapse back into the original layered structure of the phyllosilicate; and for admixture of the exfoliated polymer or oligomer-sorbed platelets with polar solvents in modifying rheology, e.g., of cosmetics, oil-well drilling fluids, in the manufacture of oil and grease, and the like.

In order to achieve the full advantage of the present invention, a gel containing the phyllosilicate is prepared by mixing the phyllosilicate with water and an organic solvent that has a polar functionality, such as an aromatic ring; a carboxyl; carbonyl; hydroxyl; amide; ether; or ester, such that a metal cation of the phyllosilicate shares electrons with two carboxyl, two carbonyl, two hydroxyl, two oxygen, two ether, two ester, two aromatic ring, and/or two amide functionalities of one or two organic solvent molecules. The water and organic solvent combination is capable of intercalating between phyllosilicate platelet layers to space the layers sufficiently such that the platelets are predominantly separated into a preponderance of individual layers and tactoids that include 1 to 5 stacked phyllosilicate platelets, predominantly a combination of individual platelets and tactoids having 2 to about 4 platelet layers, with organic solvent electrostatically bonded to the inner surfaces of the platelets.

The organic solvent used to form the phyllosilicate-containing gel (Gel A of the examples) should either be sufficiently compatible with water to form an emulsion with water, or a co-solvent can be added to make the combination of water and organic solvents sufficiently compatible that the mixture, with the phyllosilicate, can be sheared into a thixotropic gel. Preferably, the organic solvent used to form the gel should have a boiling point that is above about 75° C. such that upon heating the gel to a temperature of about 100° C.–130° C., the gel can be dehydrated without total loss of organic solvent from the gel. The electrostatic bonding of the organic solvent to the inner surfaces of the phyllosilicate platelets, however, substantially increases the energy required for separation of the solvent from the phyllosilicate surfaces, such that almost any organic solvent that contains one or more of the above-mentioned functionalities will function to produce the gel, and remain affixed to the platelet surface(s) after gel dehydration.

After gel formation and dehydration of the gel, the predominant individual platelets and 2–4 platelet layer tactoids have the organic solvent bonded to the platelet inner surfaces such that dehydration does not cause collapse of the platelets into a layered structure having more than 5 stacked platelets.

The gel then is mixed with a water-insoluble polymer and a solvent for the water-insoluble polymer and the polymer is melted by heating the mixture to a temperature sufficient to melt the polymer. It has been found that when the polymer is dissolved with a solvent and mixed with the gel, the melt temperature is lowered about 5–20 centigrade degrees below its solid melt temperature. Preferably, at least one of the organic solvents used to dissolve the water-insoluble polymer is the same as the organic solvent used to form the phyllosilicate gel, to insure solvent compatibility. Should the polymer-dissolving solvent be different from the gel forming solvent, the two solvents should be compatible, or a co-solvent can be added for the purpose of providing a compatible mixture of water and organic solvents that, together with the phyllosilicate platelets and tactoids, will remain as a thixotropic gel during mixing and heating during sequential evaporation of the water; melting of the polymer; and then evaporation of the organic solvents. As shown in Example 1, infra, the addition of a co-solvent, such as methyl ethyl ketone (MEK) aids in dehydration of the gel, it is theorized by forming an azeotrope with the water when enough water has been evaporated to form an azeotropic mixture of water and MEK. Given sufficient time for water evaporation, however, the gel can be substantially completely dehydrated, to less than about 1% by weight water, without forming an azeotropic composition with an organic solvent. The preferred compatibilizing solvents, for use with polymer-dissolving solvents that are not compatible with water are selected from the group consisting of gamma-butyrolactone:

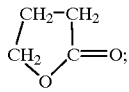

gamma-butyrolactone and diglyme ($CH_3$—O—$CH_2$—$CH_2$—O—$CH_2$—$CH_2$—O—$CH_3$); and gamma-butyrolactone, diglyme, and methyl ethyl ketone.

When added to a matrix polymer, for example, the organic solvent-sorbed platelets are predominantly completely separated or exfoliated into individual platelets or contain a predominance of a combination of individual platelets and tactoids containing a mean number of stacked platelets that number 4 or less, preferably 3 or 2. Once exfoliated, the originally adjacent platelets no longer are retained in, or collapse back into, tactoids having a parallel, spaced disposition having 5 or more platelets, but are free to move as predominantly individual platelets and 2–4 platelet tactoids throughout a matrix polymer melt, even after dehydration, to act similar to a nanoscale filler material for the matrix polymer. Once combined with a matrix polymer, the water-insoluble polymer molecules displace the relevant molecules, and the composite material is set and hardened into a desired shape, the individual polymer-sorbed or oligomer-sorbed phyllosilicate platelets are permanently fixed in position and are randomly, homogeneously and uniformly dispersed, predominantly as individual platelets, throughout the matrix polymer/platelet composite material.

As recognized, the thickness of the exfoliated, organic solvent-sorbed individual platelets (about 5–10 Å) is relatively small compared to the size of the flat opposite platelet faces. The platelets have an aspect ratio in the range of about 200 to about 4,000. Dispersing such finely divided platelet particles into a polymer melt provides a very large area of contact between polymer and platelet particles for a given volume of particles in the composite, and a high degree of platelet homogeneity in the composite material. Further, since the polymer melts are at temperatures that vaporize the water used for solvent intercalation, the platelets become dehydrated in the polymer melt, but surprisingly, do not collapse back to their original phyllosilicate structure (exfoliation is maintained).

While the nanocomposites disclosed in WO 93/04118 require a swelling/compatibilizing agent, such as a silane coupling agent, or a quaternary ammonium molecule, that has distinct bonding interactions with both the polymer and the platelet particle to achieve improved properties in the polymer, the polymer-loaded exfoliated platelets manufactured in accordance with the present invention need not have a coupling agent for intercalation and sorption of the organic solvent molecules or for the polymer or oligomer molecules later bound to the surfaces of the phyllosilicate platelets.

BRIEF DESCRIPTION OF THE DRAWINGS

FIG. 1 is a schematic representation of a top view of sodium montmorillonite clay showing the ionic charge distribution for the sodium montmorillonite clay top and interlayer surfaces showing $Na^+$ ions as the largest circles as well as magnesium and aluminum ions and Si and oxygen (Ox) atoms disposed beneath the sodium ions;

FIG. 2 is a side view (bc-projection) of the schematic representation of FIG. 1;

FIG. 3 is a schematic representation of the charge distribution on the surfaces of sodium montmorillonite clay platelets showing the distribution of positive and negative charges on the clay platelet surfaces as a result of the natural disposition of the Na, Mg, Al, Si, and oxygen (Ox) atoms of the clay shown in FIGS. 1 and 2;

DETAILED DESCRIPTION OF THE PREFERRED EMBODIMENS

Figure 4:
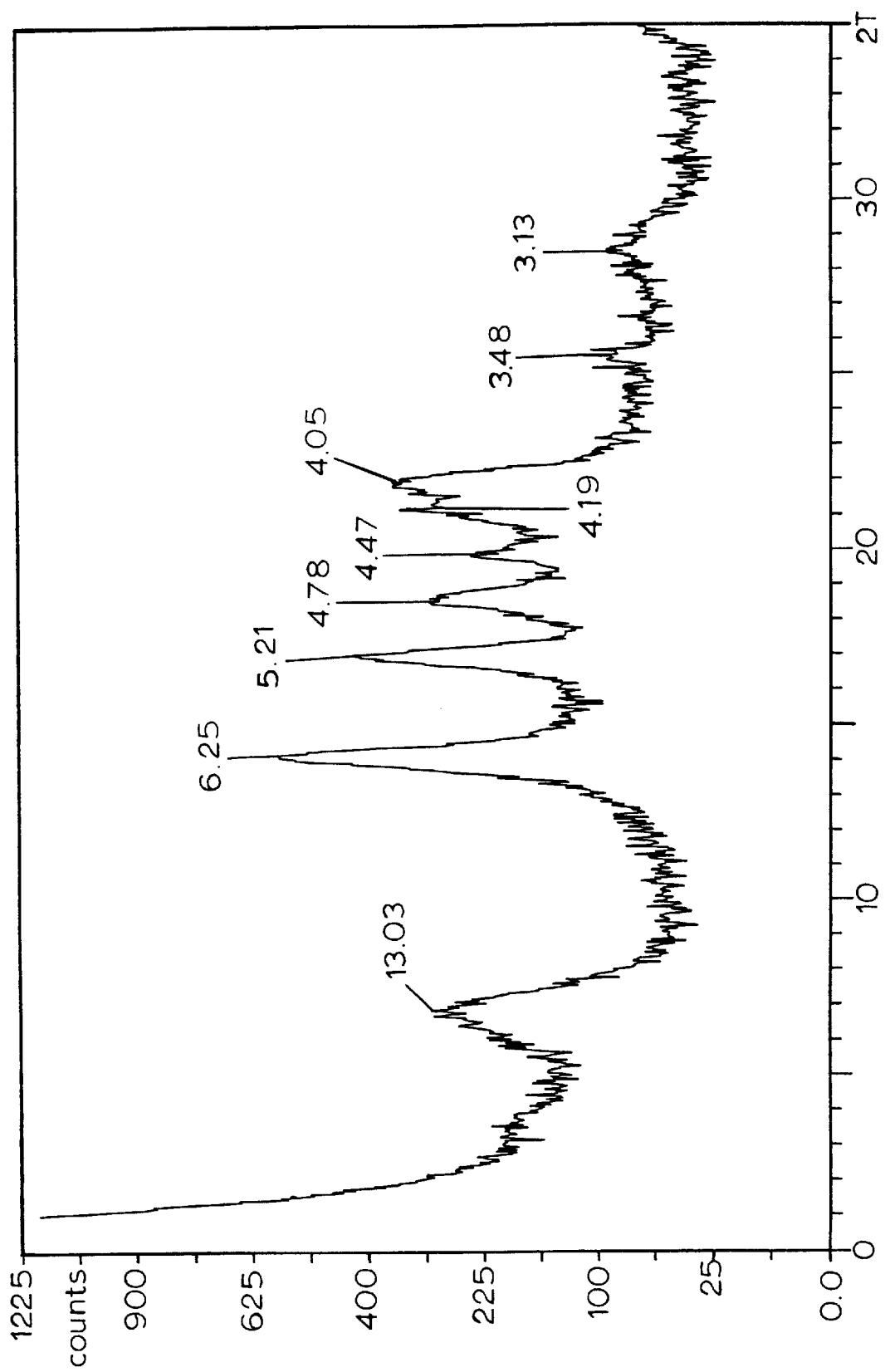
FIG. 4 is an x-ray diffraction pattern for a complex of sodium montmorillonite clay and polypropylene prepared according to Example 1.

To form the composite materials of the present invention, the phyllosilicate should be intercalated with water and an organic solvent first, then exfoliated, and finally the exfoliated platelets are contacted with a water-insoluble polymer/carrier composition that includes a solvent for the water-insoluble polymer or oligomer. The water-insoluble oligomer or polymer should include an aromatic ring and/or a functionality selected from the group consisting of carbonyl; carboxyl; hydroxyl; amine; amide; ether; ester; sulfate; sulfonate; sulfinate; sulfamate; phosphate; phosphonate; or phosphinate functionality; or an aromatic ring or combinations thereof.

Intercalation and exfoliation is achieved by mixing the phyllosilicate with water and a solvent for a later added water-insoluble oligomer or polymer. The organic solvent is intercalated between phyllosilicate platelets, and is adhered to the inner surfaces of the platelets, it is theorized, by bonding one or more polar moieties from the organic solvent to a metal cation on the platelet inner surface, so that after evaporation of the water used for intercalation of the organic solvent between phyllosilicate platelets, the platelets do not then collapse together, but remain exfoliated. The organic solvent used should be capable of dissolving at least a portion of the later added, water-insoluble polymer; must be capable of intercalating between phyllosilicate platelets sufficiently, together with water, for subsequent exfoliation of the phyllosilicate platelets, with shearing, if necessary; and must be sufficiently electrostatically bonded to the inner surfaces of the exfoliated clay platelets to maintain the platelets in the exfoliated state after dehydration of the exfoliated platelet/solvent/water composition.

The organic solvent sorbed onto the surfaces of the phyllosilicate platelets should have an affinity for the phyllosilicate so that it is sorbed onto, and is maintained associated with the silicate platelet surfaces until the exfoliated platelets are heated to a temperature sufficient to release the organic solvent from the platelets, or until the platelets are contacted with a water-insoluble polymer melt and a solvent for the water-insoluble polymer. In accordance with the present invention, the organic solvent should include an aromatic ring and/or have a functionality selected from the group consisting of a carbonyl; carboxyl; hydroxyl; amide; ether; or ester functionality. It is hereby theorized that the solvent is bonded to the phyllosilicate platelet inner surface by a mechanism selected from the group consisting of metal cation bonding or complexing, e.g., chelation; ionic complexing; electrostatic complexing; hydrogen bonding; dipole/dipole; Van Der Waals Forces; and any combination thereof, such that a metal cation of a phyllosilicate shares electrons with two carbonyl, two carboxyl, two hydroxyl, two oxygen, two ether; two ester; two aromatic ring and/or two amide functionalities of one or two organic solvent molecules. Such organic solvents have sufficient affinity for the surfaces of the phyllosilicate platelets to maintain sufficiently bonded to the surfaces of the phyllosilicate platelets, without the need for coupling agents or spacing agents, such as the onium ion or silane coupling agents disclosed in the above-mentioned prior art.

Exemplary solvents include dimethyl sulfoxide (DMSO); isophorone; gamma-butyrolactone n-methylpyrrolidone; 2-pyrrolidone; diglyme; caprolactam; furfural alcohol; tetrahydrofuran; and mixtures thereof.

In accordance with a preferred embodiment of the present invention, the amount of polymer or oligomer in contact with the exfoliated phyllosilicate platelets should provide a polymer or oligomer/phyllosilicate platelet weight ratio (based on the dry weight of the phyllosilicate) of at least about 10/100, preferably at least about 16/100, and more preferably about 20–70/100, to provide sufficient sorption of the water-insoluble polymer or water-insoluble oligomer onto the exfoliated platelets of the layered material, e.g., phyllosilicate, (preferably about 16 to about 70 percent by weight polymer or oligomer, based on the dry weight of the layered silicate material).

The water-insoluble polymers and oligomers are solubilized in the polymer/carrier composition, and the polymer and/or oligomer should be included in the composition in an amount sufficient to provide a polymer or oligomer concentration of at least about 2%, preferably at least about 5% by weight polymer or oligomer, more preferably at least about 50% to about 100% by weight polymer or oligomer in the polymer/carrier composition. The polymer can be added as a solid with the addition to the polymer/carrier composition of about 20% to about 80% polymer solvent.

Any swellable layered material that sufficiently sorbs the polymer or oligomer may be used in the practice of this invention. Useful swellable layered materials include phyllosilicates, such as smectite clay minerals, e.g., montmorillonite, particularly sodium montmorillonite; magnesium montmorillonite; and/or calcium montmorillonite; nontronite; beidellite; volkonskoite; hectorite; saponite; sauconite; sobockite; stevensite; svinfordite; vermiculite; and the like. Other useful layered materials include micaceous minerals, such as illite and mixed layered illite/smectite minerals, such as ledikite and admixtures of illites with the clay minerals named above. Preferred swellable layered materials are phyllosilicates of the 2:1 type having a negative charge on the layers ranging from about 0.15 to about 0.9 charges per formula unit and a commensurate number of exchangeable metal cations in the interlayer spaces. Most preferred layered materials are smectite clay minerals such as montmorillonite, nontronite, beidellite, volkonskoite, hectorite, saponite, sauconite, sobockite, stevensite, and svinfordite.

The amount of water-insoluble polymer or oligomer sorbed onto the surfaces of the exfoliated platelets of the layered materials useful in this invention, may vary substantially between about 15% and about 80%, based on the dry weight of the exfoliated platelets of the layered silicate material. In the preferred embodiments of the invention, amounts of polymer or oligomers employed, with respect to the dry weight of exfoliated platelets of the layered material, will preferably range from about 16 grams of polymer or oligomer/100 grams of layered material (dry basis) to about 80 grams polymer or oligomer/100 grams of exfoliated platelets. More preferred amounts are from about 20 grams polymer or oligomer/100 grams of exfoliated platelets to about 60 grams polymer or oligomer/100 grams of exfoliated platelets (dry basis).

The polymers and oligomers are bonded to (sorbed onto) the platelets surfaces as follows. In a preferred method of sorption, the exfoliated platelets of a layered material are intimately mixed, e.g., by extrusion, with a concentrated polymer/carrier composition containing the polymer and/or oligomer; water; and a solvent for the polymer, e.g., organic solvent, such as alcohols, esters, ketones, ethers, alkylamides, aromatic solvents, glycols and the like. To achieve sufficient sorption of the polymer or oligomer onto the platelet surfaces, the exfoliated platelets of the layered material/polymer/carrier composition contains at least about 16% by weight polymer or oligomer, based on the dry weight of the exfoliated platelets of the layered material.

The polymer carrier (an organic solvent for the polymer or oligomer) can be added by first solubilizing or dispersing the polymer or oligomer in a suitable organic solvent carrier; or the dry polymer or oligomer and exfoliated phyllosilicate platelets can be blended and the polymer solvent added to the blend, or to the exfoliated phyllosilicate platelets prior to adding the dry polymer or oligomer.

Alternatively, the polymer carrier, e.g., an organic solvent for the oligomer or polymer, can be added directly to the exfoliated phyllosilicate platelets prior to adding the polymer or oligomer (either dry or in solution). Alternatively, the exfoliated platelets of the layered material can be added to liquid polymer or liquid oligomer melt compositions (solubilized with an organic solvent for the polymer or oligomer, and heated to at least the melt temperature for the polymer or oligomer) containing at least about 2% by weight, preferably at least about 5% by weight polymer or oligomer, more preferably at least about 50% polymer or oligomer, based on the total weight of the polymer/carrier composition (polymer plus organic solvent for the polymer). Sorption may be aided by exposure of the mixture of polymer/solvent composition and exfoliated platelets of the layered material to heat, pressure, ultrasonic cavitation, or microwaves.

In accordance with one important embodiment of the present invention, one or more polymerizable monomers can be sorbed onto the exfoliated platelets of the layered material, or simply admixed with the exfoliated layered material, and the polymerizable monomer(s) are polymerized while in contact with the exfoliated platelets. The polymerizable monomer(s) can be, for example, a mixture of a diamine and a dicarboxylic acid suitable for reaction to produce a polyamide, e.g., nylon; or the monomer(s) can be any of the polymerizable organic liquids, that polymerize to form a water-insoluble polymer, disclosed in U.S. Pat. No. 4,251,576, hereby incorporated by reference.

Suitable broad classes of water-insoluble polymers and oligomers include polyamides; polyesters; polycarbonates; polyurethanes; polyepoxides; polyolefins; polyalkylamides; and mixtures thereof. Suitable specific water-insoluble polymers and oligomers include:

polyethers (polymers and copolymers) based on ethylene oxide, butylene oxide, propylene oxide, phenols and bisphenols;

polyesters (polymers and copolymers) based on aliphatic and aromatic diols, and aliphatic and aromatic dibasic acids;

polyurethanes based on aliphatic and aromatic diisocyanates, and aliphatic and aromatic diols;

polyamides (polymers and copolymers) based on (1) aliphatic and aromatic diamines, and aliphatic and aromatic dibasic acids; (2) aliphatic and aromatic amino acids;

polycarbonates (polymers and copolymers) based on carbonic acid and aromatic diols);

polycarbonimides (polymers and copolymers) based on dianhydride of tetrabasic acids and diamines and other heterochain polymers;

vinyl polymers and copolymers based on vinyl monomers, styrene and derivatives of styrene;

acryl polymers and copolymers based on acryl monomers;

copolymers based on styrene, vinyl and acryl monomers;

polyolefins polymers and copolymers based on ethylene, propylene and other alphaolefin monomers;

polymers and copolymers based on dienes, isobutylenes and the like; and copolymers based on dienes, styrene, acryl and vinyl monomers.

Thermoset water-insoluble resins based on water-soluble prepolymers, include prepolymers based on formaldehyde: phenols (phenol, cresol and the like); urea; melamine; melamine and phenol; urea and phenol. Polyurethanes based on: toluene diisocyanate (TDI) and monomeric and polymeric diphenyl methanediisocyanates (MDI); hydroxy terminated polyethers (polyethylene glycol, polypropylene glycol, copolymers of ethylene oxide and propylene oxide and the like); amino terminated polyethers, polyamines (tetramethylene diamine, ethylenediamine, hexamethylenediamine, 2,2-dimethyl 1,3-propanediamine, melamine, diaminobenzene, triaminobenzene and the like); polyamidoamines (for instance, hydroxy terminated polyesters); unsaturated polyesters based on maleic and fumaric anhydrides and acids; glycols (ethylene, propylene), polyethylene glycols, polypropylene glycols, aromatic glycols and polyglycols; unsaturated polyesters based on vinyl, allyl and acryl monomers; epoxides, based on biphenol A (2,2'-bis(4-hydroxyphenyl) propane) and epichlorohydrin; epoxy prepolymers based on monoepoxy and polyepoxy compounds and $\alpha,\beta$ unsaturated compounds (styrene, vinyl, allyl, acrylic monomers); polyamides 4-tetramethylene diamine, hexamethylene diamine, melamine, 1,3-propanediamine, diaminobenzene, triaminobenzene, 3,3',4,4'-bitriaminobenzene; 3,3',4,4'-biphenyltetramine and the like). Polyethyleneimines; amides and polyamides (amides of di-, tri-, and tetra acids); hydroxyphenols (pyrogallol, gallic acid, tetrahydroxybenzophenone, tetrahydroquinone, catechol, phenol and the like); anhydrides and polyanhydrides of di-, tri-, and tetra acids; polyisocyanurates based on TDI and MDI; polyimides based on pyromellitic dianhydride and 1,4-phenyldiamine; polybenzimidozoles based on 3,3',4,4'-biphenyltetramine and isophthalic acid; polyamide based on unsaturated dibasic acids and anhydrides (maleic, fumaric) and aromatic polyamides; alkyd resins based on dibasic aromatic acids or anhydrides, glycerol, trimethylolpropane, pentaerythritol, sorbitol and unsaturated fatty long chain carboxylic acids (the latter derived from vegetable oils); and prepolymers based on acrylic monomers (hydroxyl or carboxyl functional).

The amount of water-insoluble polymer or water-insoluble oligomer-sorbed exfoliated platelets included in the matrix polymer to form the composite material may vary widely depending on the intended use of the composite. For example, relatively, larger amounts of platelet particles (exclusive of the intercalant polymer, since the intercalant polymer content in the layered material may vary), i.e. from about 15% to about 30% by weight of the mixture, are used in applications where articles are formed by stamping. Substantially enhanced barrier properties and heat resistance (deflection temperature under load, DTUL) are imparted by platelet particle concentrations greater than about 2.5%. Similarly, substantially enhanced strength is imparted by platelet particle concentrations greater than about 1.5%, including the nano-scale layered materials of this invention. It is preferred that the platelet loading be less than about 10%. Platelet particle loadings within the range of about 0.05% to about 40% by weight, preferably about 0.5% to about 20%, more preferably about 1% to about 10% of the composite material significantly enhances modulus, dimensional stability, and wet strength. In general, the amount of platelet particles incorporated into a matrix polymer is less than about 90% by weight of the mixture, and preferably from about 0.01% to about 80% by weight of the composite material mixture, more preferably from about 0.05% to about 40% by weight of the polymer/particle mixture, and most preferably from about 0.05% to about 20% or 0.05% to about 10% by weight, with some matrix polymers.

In accordance with an important feature of the present invention, the exfoliated platelets having adhered organic solvent can be manufactured and transported as concentrated platelets containing solvent for a subsequently added water-insoluble polymer, e.g., 30 to 70 percent by weight platelets and 70 to 30 percent by weight solvent; or the exfoliated platelets can be manufactured in a concentrated form, e.g., 10–90%, preferably 20–80% polymer and 10–90%, preferably 20–80% by weight exfoliated phyllosilicate platelets that can be dispersed in a matrix polymer.

The organic solvent-treated phyllosilicate platelets can be dispersed into one or more melt processible thermoplastic and/or thermosetting matrix oligomers or polymers, or mixtures thereof. Advantageously, the organic solvent-coated platelets do not collapse upon water evaporation as would otherwise occur without the presence of the platelet-adhered organic solvent. Matrix polymers for use in the process of this invention may vary widely, the only requirement is that they are melt processable. In the preferred embodiments of the invention, the polymer includes at least 10, preferably at least 30 recurring monomeric units. The upper limit to the number of recurring monomeric units is not critical, provided that the melt index of the matrix polymer under use conditions is such that the matrix polymer forms a flowable mixture. Most preferably, the matrix polymer includes from at least about 10 to about 100 recurring monomeric units. In the most preferred embodiments of this invention, the number of recurring units is such that the matrix polymer has a melt index of from about 0.01 to about 12 grams per 10 minutes at the processing temperature.

Thermoplastic resins and rubbers for use as matrix polymers and/or polymers, or oligomers that can be sorbed onto the surfaces of exfoliated phyllosilicate platelets, in the practice of this invention may vary widely. Illustrative of useful thermoplastic resins, which may be used alone or in admixture, are polylactones such as poly(pivalolactone), poly(caprolactone) and the like; polyurethanes derived from reaction of diisocyanates such as 1,5-naphthalene diisocyanate; p-phenylene diisocyanate, m-phenylene diisocyanate, 2,4-toluene diisocyanate, 4,4'-diphenylmethane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, 4,4'-diisocyanatodiphenylmethane and the like and linear long-chain diols such as poly (tetramethylene adipate), poly(ethylene adipate), poly(1,4-butylene adipate), poly(ethylene succinate), poly(2,3-butylene succinate), polyether diols and the like; polycarbonates such as poly[methane bis(4-phenyl) carbonate], poly[1,1-ether bis(4-phenyl) carbonate], poly [diphenylmethane bis(4-phenyl) carbonate], poly [1,1-cyclohexane bis(4-phenyl) carbonate] and the like; polysulfones; polyethers; polyketones; polyamides such as poly(4-amino butyric acid), poly(hexamethylene adipamide), poly (6-aminohexanoic acid), poly(m-xylylene adipamide), poly (p-xylylene sebacamide), poly(2,2,2-trimethyl hexamethylene terephthalamide), poly(metaphenylene isophthalamide) (NOMEX), poly(p-phenylene terephthalamide) (KEVLAR), and the like; polyesters such as poly(ethylene azelate), poly(ethylene-1,5-naphthalate, poly(1,4-cyclohexane dimethylene terephthalate), poly (ethylene oxybenzoate) (A-TELL), poly(para-hydroxy benzoate) (EKONOL), poly(1,4-cyclohexylidene dimethylene terephthalate) (KODEL) (cis), poly(1,4-cyclohexylidene dimethylene terephthalate) (Kodel) (trans), polyethylene terephthalate, polybutylene terephthalate and the like; poly(arylene oxides) such as poly(2,6-dimethyl-1,4-phenylene oxide), poly(2,6-diphenyl-1,4-phenylene oxide) and the like; poly(arylene sulfides) such as poly (phenylene sulfide) and the like; polyetherimides; vinyl polymers and their copolymers such as polyvinyl acetate, polyvinyl chloride; polyvinyl butyral, polyvinylidene chloride, ethylene-vinyl acetate copolymers, and the like; polyacrylics, polyacrylate and their copolymers such as polyethyl acrylate, poly(n-butyl acrylate), polymethylmethacrylate, polyethyl methacrylate, poly(n-butyl methacrylate), poly(n-propyl methacrylate), polyacrylonitrile, water-insoluble ethylene-acrylic acid copolymers, water-insoluble ethylene-vinyl alcohol copolymers acrylonitrile copolymers, methyl methacrylate-styrene copolymers, ethylene-ethyl acrylate copolymers, methacrylated butadiene-styaene copolymers and the like; polyolefins such as low density poly(ethylene), poly(propylene), chlorinated low density poly(ethylene), poly(4-methyl-1-pentene), poly(ethylene), poly(styrene), and the like; water-insoluble ionomers; poly(epichlorohydrins); poly(urethane) such as the polymerization product of one or more diols such as ethylene glycol, propylene glycol, and/or a polydiol, such as diethylene glycol, triethylene glycol, and/or tetraethylene glycol, and the like, with a diisocyanate such as 2,4-tolylene diisocyanate, 2,6-tolylene diisocyante, 4,4'-diphenylmethane diisocyanate, 1,6-hexamethylene diisocyanate, 4,4'-dicyclohexylmethane diisocyanate and the like; and polysulfones such as the reaction product of the sodium salt of 2,2-bis(4-hydroxyphenyl) propane and 4,4'-dichlorodiphenyl sulfone; furan resins such as poly(furan); cellulose ester plastics such as cellulose acetate, cellulose acetate butyrate, cellulose propionate and the like; silicones such as poly(dimethyl siloxane), poly(dimethyl siloxane co-phenylmethyl siloxane), and the like; protein plastics; and blends of two or more of the foregoing.

Vulcanizable and thermoplastic rubbers useful as matrix polymers and/or polymers, or oligomers that can be sorbed onto the surfaces of exfoliated phyllosilicate platelets, in the practice of this invention may also vary widely. Illustrative of such rubbers are brominated butyl rubber, chlorinate butyl rubber, polyurethane elastomers, fluoroelastomers, polyester elastomers, polyvinylchloride, butadiene/acrylonitrile elastomers, silicone elastomers, poly(butadiene), poly (isobutylene), ethylene-propylene copolymers, ethylene-propylene-diene terpolymers, sulfonated ethylene-propylene-diene terpolymers, poly(chloroprene), poly (2,3-dimethylbutadiene), poly(butadiene-pentadiene), chlorosulphonated poly(ethylenes), poly(sulfide) elastomers, block copolymers, made up of segments of glassy or crystalline blocks such as poly(styrene), poly (vinyl-toluene), poly(t-butyl styrene), polyesters and the like and the elastomeric blocks such as poly(butadiene), poly (isoprene), ethylene-propylene copolymers, ethylene-butylene copolymers, polyether and the like as for example the copolymers in poly(styrene)-poly(butadiene)-poly (styrene) block copolymer manufactured by Shell Chemical Company under the trade name KRATON®.

Useful thermosetting resins include, for example, the polyamides; polyalkylamides, polyesters; polyurethanes; polycarbonates; polyepoxides; and mixtures thereof.

Most preferred thermoplastic polymers for use as matrix polymers and/or polymers, oligomers that can be sorbed onto the surfaces of exfoliated phyllosilicate platelets, are thermoplastic polymers such as polyamides, polyesters, and polymers of alphabeta unsaturated monomers and copolymers. Polyamides which may be used in the process of the present invention are synthetic linear polycarbonamides characterized by the presence of recurring carbonamide groups as an integral part of the polymer chain which are separated from one another by at least two carbon atoms. Polyamides of this type include polymers, generally known in the art as nylons, obtained from diamines and dibasic acids having the recurring unit represented by the general formula:

—NHCOR$^{13}$COHNR$^{14}$— in which R$^{13}$ is an alkylene group of at least 2 carbon atoms, preferably from about 2 to about 11, or arylene having at least about 6 carbon atoms, preferably about 6 to about 17 carbon atoms; and R$^{14}$ is selected from R$^{13}$ and aryl groups. Also, included are copolyamides and terpolyamides obtained by known methods, for example, by condensation of hexamethylene diamine and a mixture of dibasic acids consisting of terephthalic acid and adipic acid. Polyamides of the above description are well-known in the art and include, for example, the copolyamide of 30% hexamethylene diammonium isophthalate and 70% hexamethylene diammonium adipate, poly(hexamethylene adipamide) (nylon 6,6), poly(hexamethylene sebacamide) (nylon 6,10), poly(hexamethylene isophthalamide), poly(hexamethylene terephthalamide), poly(heptamethylene pimelamide) (nylon 7,7), poly(octamethylene suberamide) (nylon 8,8), poly(nonamethylene azelamide) (nylon 9,9) poly(decamethylene azelamide) (nylon 10,9), poly(decamethylene sebacamide) (nylon 10,10), poly[bis(4-amino cyclohexyl)methane-1,10-decane-carboxamide)], poly(m-xylylene adipamide), poly(p-xylylene sebacamide), poly(2,2,2-trimethyl hexamethylene terephthalamide), poly(piperazine sebacamide), poly(p-phenylene terephthalamide), poly(metaphenylene isophthalamide) and the like.

Other useful polyamides are those formed by polymerization of amino acids and derivatives thereof, as, for example, lactams. Illustrative of these useful polyamides are poly(4-aminobutyric acid) (nylon 4), poly(6-aminohexanoic acid) (nylon 6), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12) and the like.

Preferred polyamides are poly(caprolactam), poly(12-aminododecanoic acid) and poly(hexamethylene adipamide).

Other matrix (host) polymers and/or polymers which may be sorbed onto the surfaces of exfoliated platelets to form nanocomposites are linear polyesters. The type of polyester is not critical and the particular polyesters chosen for use in any particular situation will depend essentially on the physical properties and features, i.e., tensile strength, modulus and the like, desired in the final form. Thus, a multiplicity of linear thermoplastic polyesters having wide variations in physical properties are suitable for use in admixture with exfoliated layered material platelets in manufacturing nanocomposites in accordance with this invention.

The particular polyester chosen for use can be a homopolyester or a co-polyester, or mixtures thereof, as desired. Polyesters are normally prepared by the condensation of an organic dicarboxylic acid and an organic diol, and, the reactants can be added to the exfoliated platelets for in situ polymerization of the polyester while in contact with the exfoliated layered material platelets, after exfoliation of the phyllosilicate.

Polyesters which are suitable for use as matrix polymers and/or polymers, or oligomers that can be sorbed onto the surfaces of exfoliated phyllosilicate platelets in this invention are those which are derived from the condensation of aromatic, cycloaliphatic, and aliphatic diols with aliphatic, aromatic and cycloaliphatic dicarboxylic acids and may be cycloaliphatic, aliphatic or aromatic polyesters.

Exemplary of useful cycloaliphatic, aliphatic and aromatic polyesters which can be utilized as matrix polymers, and/or polymers or oligomers that can be sorbed onto the surfaces of exfoliated phyllosilicate platelets in the practice of the present invention are poly(ethylene terephthalate), poly(cyclohexylenedimethylene terephthalate), poly(ethylene dodecate), poly(butylene terephthalate), poly[ethylene(2,7-naphethalate)], poly(methaphenylene isophthalate), poly(glycolic acid), poly(ethylene succinate), poly(ethylene adipate), poly(ethylene sebacate), poly(decamethylene azelate), poly(ethylene sebacate), poly(decamethylene adipate), poly(decamethylene sebacate), poly(dimethylpropiolactone), poly(para-hydroxybenzoate) (EKONOL), poly(ethylene oxybenzoate) (A-tell), poly(ethylene isophthalate), poly(tetramethylene terephthalate, poly(hexamethylene terephthalate), poly(decamethylene terephthalate), poly(1,4-cyclohexane dimethylene terephthalate) (trans), poly(ethylene 1,5-naphthalate), poly(ethylene 2,6-naphthalate), poly(1,4-cyclohexylidene dimethylene terephthalate), (KODEL) (cis), and poly(1,4-cyclohexylidene dimethylene terephthalate (KODEL) (trans).

Polyester compounds prepared from the condensation of a diol and an aromatic dicarboxylic acid are especially suitable as matrix polymers, and/or polymers or oligomers that can be sorbed onto the surfaces of exfoliated phyllosilicate platelets in accordance with the present invention. Illustrative of such useful aromatic carboxylic acids are terephthalic acid, isophthalic acid and o-phthalic acid, 1,3-naphthalene-dicarboxylic acid, 1,4-naphthalenedicarboxylic acid, 2,6-naphthalenedicarboxylic acid, 2,7-naphthalene-dicarboxylic acid, 4,4'-diphenyldicarboxylic acid, 4,4'-diphenylsulfone-dicarboxylic acid, 1,1,3-trimethyl-5-carboxy-3-(p-carboxyphenyl)-idane, diphenyl ether 4,4'-dicarboxylic acid, bis-p(carboxy-phenyl) methane and the like. Of the aforementioned aromatic dicarboxylic acids, those based on a benzene ring (such as terephthalic acid, isophthalic acid, orthophthalic acid) are preferred for use in the practice of this invention. Among these preferred acid precursors, terephthalic acid is particularly preferred acid precursor.

The most preferred embodiments of the invention that incorporate a polymer or oligomer onto the phyllosilicate platelet surface includes a polymer selected from the group consisting of poly(ethylene terephthalate), poly(butylene terephthalate), poly(1,4-cyclohexane dimethylene terephthalate), a polyvinylimine, and mixture thereof. Among these polyesters of choice, poly(ethylene terephthalate) and poly(butylene terphthalate) are most preferred.

Still other useful thermoplastic homopolymers and copolymers forming the polymers or oligomers that can be sorbed onto the surfaces of the exfoliated phyllosilicate platelets, and/or as matrix polymers for forming nanocomposites are polymers formed by polymerization of alpha-beta-unsaturated monomers or the formula:

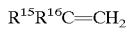

wherein:

$R^{15}$ and $R^{16}$ are the same or different and are cyano, phenyl, carboxy, alkylester, halo, alkyl, alkyl substituted with one or more chloro or fluoro, or hydrogen. Illustrative of such preferred homopolymers and copolymers are homopolymers and copolymers of ethylene, propylene, vinyl alcohol, acrylonitrile, vinylidene chloride, esters of acrylic acid, esters of methacrylic acid, chlorotrifluoroethylene, vinyl chloride and the like. Preferred are poly(propylene), propylene copolymers, poly(ethylene) and ethylene copolymers. More preferred are poly(ethylene) and poly(propylene).

In the preferred embodiments of the invention, the platelet-sorbed polymers and matrix polymers of choice in manufacturing nanocomposites are polymers and copolymers of olefins, polyesters, polyamides, polyvinylimines, and blends thereof containing polyesters. In the particularly preferred embodiments of the invention, polymers and copolymers of ethylene, polyamides (preferably nylon 6 and nylon 66 and more preferably nylon 6), and blends thereof are used both for sorption onto exfoliated platelet surfaces, and as matrix polymers.

The mixture may include various optional components which are additives commonly employed with polymers. Such optional components include nucleating agents, fillers, plasticizers, impact modifiers, chain extenders, plasticizers, colorants, mold release lubricants, antistatic agents, pigments, fire retardants, and the like. These optional components and appropriate amounts are well known to those skilled in the art.

The first step of exfoliation of the layered material should provide delamination of at least about 99% by weight of the phyllosilicate material to provide a nanocomposite composition comprising a matrix polymer having polymer-sorbed or oligomer-sorbed platelet particles substantially homogeneously dispersed therein.

As formed by this process, the polymer-treated or oligomer-treated exfoliated platelet particles dispersed in matrix polymers have the thickness of the individual platelet layers and polymer or oligomer coatings.

The effect of adding into a matrix polymer the nanoscale particulate dispersed platelet particles, polymer-treated in accordance with the present invention, typically is an increase in tensile modulus and ultimate tensile strength or an increase in ultimate impact resistance or glass transition temperature (Tg).

Molding compositions comprising a thermoplastic or thermosetting polymer containing a desired loading of polymer-sorbed or oligomer-sorbed platelets manufactured according to the invention are outstandingly suitable for the production of sheets and panels having valuable properties. Such sheets and panels may be shaped by conventional processes such as vacuum processing or by hot pressing to form useful objects. The sheets and panels according to the invention are also suitable as coating materials for other materials comprising, for example, wood, glass, ceramic, metal or other plastics, and outstanding strengths can be achieved using conventional adhesion promoters, for example, those based on vinyl resins. The sheets and panels can also be laminated with other plastic films and this is preferably effected by co-extrusion, the sheets being bonded in the molten state. The surfaces of the sheets and panels, including those in the embossed form, can be improved or finished by conventional methods, for example by lacquering or by the application of protective films.

The polymer/platelet composite materials are especially useful for fabrication of extruded films and film laminates, as for example, films for use in food packaging. Such films can be fabricated using conventional film extrusion techniques. The films are preferably from about 10 to about 100 microns, more preferably from about 20 to about 100 microns and most preferably from about 25 to about 75 microns in thickness.

The homogeneously distributed polymer-treated or oligomer-treated platelet particles and matrix polymer that form the nanocomposites are formed into a film by suitable film-forming methods. Typically, the composition is melted and forced through a film forming die. The film of the nanocomposite may go through steps to cause the platelets to be further oriented so the major planes through the platelets are substantially parallel to the major plane through the film. A method to do this is to biaxially stretch the film. For example, the film is stretched in the axial or machine direction by tension rollers pulling the film as it is extruded from the die. The film is simultaneously stretched in the transverse direction by clamping the edges of the film and drawing them apart. Alternatively, the film is stretched in the transverse direction by using a tubular film die and blowing the film up as it passes from the tubular film die. The films may exhibit one or more of the following benefits: increased modulus; increased wet strength; increased dimensional stability; decreased moisture adsorption; decreased permeability to gases such as oxygen and liquids, such as water, alcohols and other solvents.

The following specific examples are presented to more particularly illustrate the invention and are not to be construed as limitations thereon.

As shown in the following examples 1 to 3 and 6, sodium bentonite clay was intercalated with solvent/water intercalating compositions, using various organic solvents capable of solubilizing a subsequently added water-insoluble polymer, and after exfoliation of the clay, the platelets and tactoids were then contacted with the water-insoluble polymer in the form of a polymer melt to adhere the polymer to the platelet surfaces, with dehydration of the exfoliated platelets, and without collapse of the platelets:

EXAMPLE 1 (FIG. 4)

| I. Preparation of Gel A | | |
|---|---|---|
| | Initial Wt. % | Final Wt. % |
| $H_2O$-267 g | [19.06% total wt.] | [0% total wt.] |
| Gamma Butyrolactone (GBL) - 267g | [28.57% total wt.] | [46.88% total wt.] |
| Diglyme (DG) - 267 g | [28.57% total wt.] | [46.88% total wt.] |
| Sodium Bentonite (Belle Yellow) clay - 53.3 g | [3.80% total wt.] | [6.24% total wt.] |

Mix the $H_2O$, GBL and DG, then slowly add the Belle Yellow clay.
Mix until the clay is completely dispersed or exfoliated.
Mixture is a thixotropic gel and looks like grease.

| II. Add solvent(s) Compatible with Water And Dehydration of Gel |
|---|
| Premix the following, then add under agitation to Gel A |
| GBL-133.3 g |
| DG-133.3 g |

Mix until dispersed thoroughly.
Then under agitation added 280 g Methyl Ethyl Ketone (MEK) (About 20%–30% of the total weight of Gel A plus $H_2O$-compatible solvent(s)).
Apply heat 80–100° C. until dehydration of Gel A (until 0.5% moisture content, or below)
Keep mixture mixing at all times

| III. Preparation of Polypropylene with Isophorone and Gel A | | |
|---|---|---|
| | Initial Wt. % | Final Wt. % |
| Polypropylene (PP) Concentrate - 10 g | [8.32% total wt.] | [85% total wt.] |
| Isophorone - 85 g | [70.75% total wt.] | [0% total wt.] |
| Gel A-25.14 g (for 15% Clay) | [20.93% total wt.] | [0% total wt.] |
| 7% Belle Yellow in gel A | [1.46% total wt.] | [15% total wt.] |

In a closed system, using a J-Flux bath, add all the PP Concentrate, Isophorone and Gel A in a 150 ml beaker.
Begin heating and shearing the solution.
The closed system prevents the isophrone from evaporating too quickly.
Continue under high shear until the PP Concentrate melts.
Then begin the timer.
Continue under high shear for three hours.
During these hours continually check the temperature (maintain above PP melt temp., e.g., 180–200° C.).

III. Preparation of Polypropylene with Isophorone and Gel A

|  | Initial Wt. % | Final Wt. % |
|---|---|---|

Then after three hours open the system, to allow the water and solvent(s) to evaporate.
Allow this mixture to shear for three hours.
The shear time depends on the rate of isophorone evaporation.
Then let cool.
Wash with acetone, after the first wash the acetone will be a dark burnt orange or brown color.
Continue washing until the color is diminised greatly.
The used acetone should have a slightly yellowish color when finished washing.
Allow to dry overnight.

An x-ray diffraction pattern for the material prepared by this Example 1 is shown in FIG. 4. The width of the base of the peak at 13.03 Å (polypropylene) indicates that the exfoliated clay platelets and tactoids have a mean thickness of 3.9 nm or 39 Å, indicating that the exfoliate has a mean number of three platelets with a layer of polymer between each of the pairs of adjacent platelets.

The following examples and associated drawing figures show that the phyllosilicate (sodium bentonite) is exfoliated and remains exfoliated after water removal by contact with water and an organic solvent, (Examples 5 and 6); but the phyllosilicate cannot be exfoliated without water (clay and organic solvent only—Example 4, FIG. 6); that the phyllosilicate can be exfoliated without the organic solvent (water only), but upon dehydration, the exfoliated platelets collapse to the layered structure once again; and shows that after exfoliation with solvent and water, attempts to exchange a water-insoluble polymer for the solvent adhered to the platelets, by contacting the platelets with a polymer melt, is unsuccessful without the polymer melt including a solvent (at least about 25% based on the weight of the polymer) for the water-insoluble polymer (Example 5—FIG. 9):

EXAMPLE 2—(FIGS. 5 AND 6)

Figure 5:
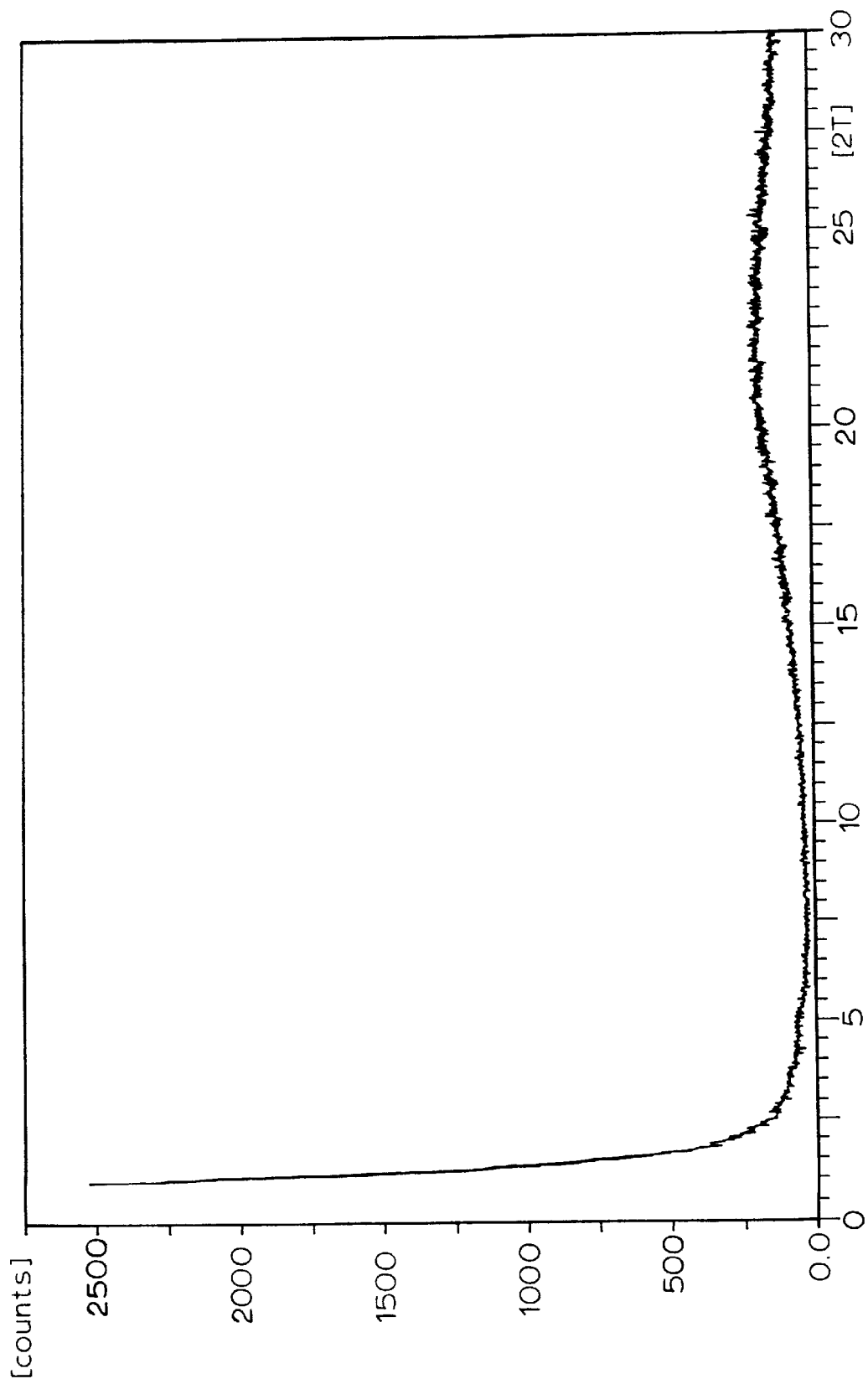
FIG. 5 is an x-ray diffraction pattern for the gel prepared according to example 2, showing full exfoliation of the clay platelets.

I. Exfoliating Belle Yellow Sodium Bentonite (Gel A)
  A. Add 100 ml of water to a 2000 ml beaker, then using the Caframo mixer with a 2 inch diameter shearing blade, slowly add Belle Yellow (a teaspoonful at a time, appr. 5 g) and 5 g dimethyl sulfoxide (DMSO) to the water while mixing.
  B. Adjust mixing speed if necessary to maintain optimal shearing capacity because viscosity will increase as Belle Yellow is incorporated into water and DMSO. The vortex should be about ⅓ the way down into the beaker if possible.
  C. Allow the mixture to shear for 1 hour until it is completely homogenized.
  D. Run an X-ray scan of the gel to ensure exfoliation. (See FIG. 5).

II. Polymer+Nanocomposite
  A. Into a large stainless steel container, add dimethyl sulfoxide (DMSO), gel A (Belle Yellow+water), and ethylene vinyl alcohol polymer (EV-OH).
  B. Using a hot plate, heat the reactants to 110° C.
  C. While the reactants are heating, shear and mix the gel into the polymer via the Coules mixer.
  D. When polymer is 100% melted, increase the speed of mixer and allow reactants to shear for at least 3 hours, to evaporate the water.
  E. Stop reaction, pour products into trays and let cool overnight.
  F. Break product into tiny chunks of about 1–22 mm.
  G. Wash finished polymer by running hot water through it until there is no trace of DMSO.
  H. Run tests. (TGA, X-rays, clarity by microscope)

NOTE: For higher percentages of clay in polymer, adjust ratio and incorporate corrected amount to reaction. For example, for a 10% concentration, use 100 g Belle Yellow and 900 g EV-OH. The amount of solvent to use at this time is variable. A ratio of 5% clay to 95% by weight water to make the gel is preferred. From that ratio, a 50:50 $H_2O$ to DMSO is used, therefore, 1900 g of $H_2O$ and 1900 g DMSO is used for the 10% concentration.

Figure 6:
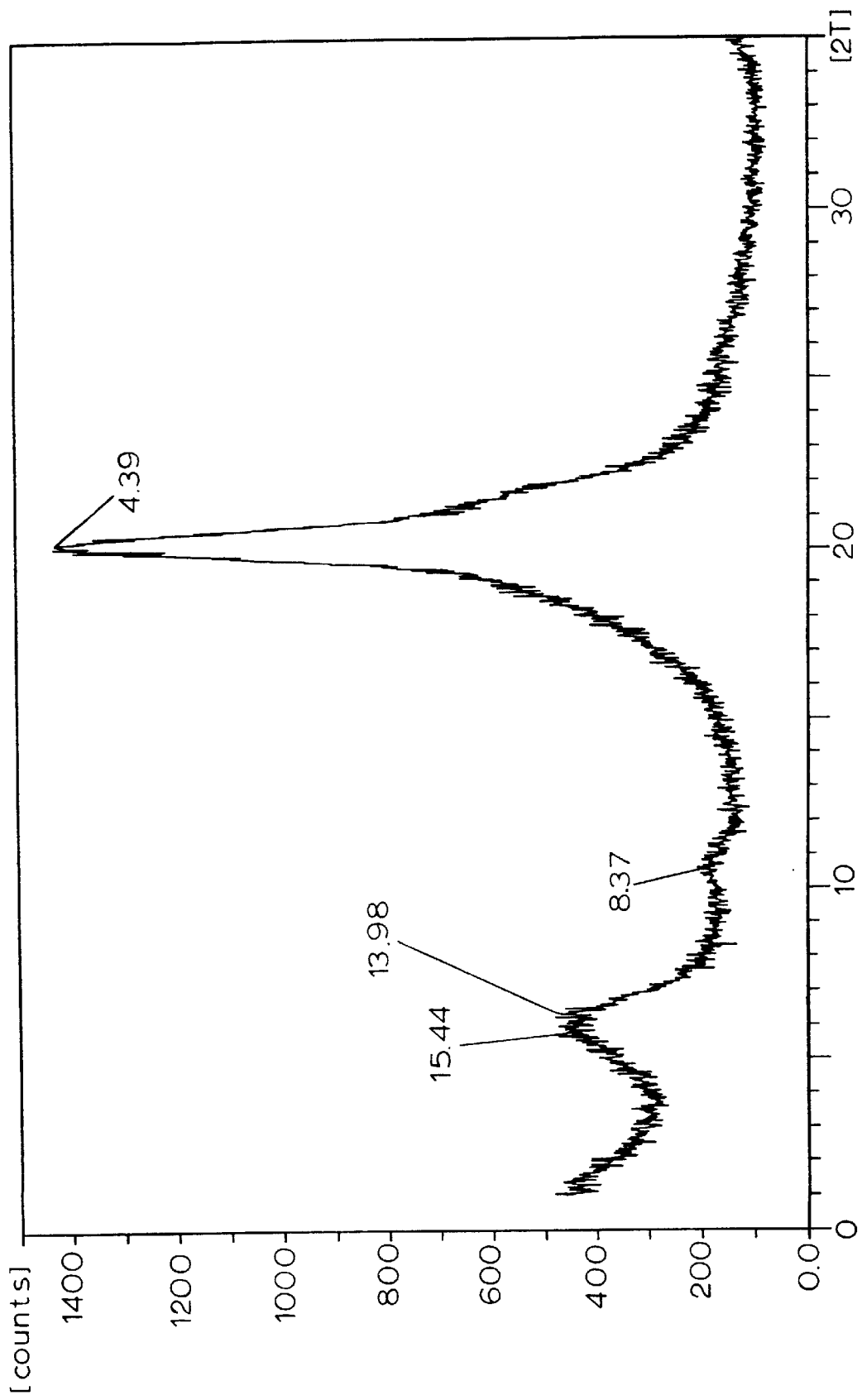
FIG. 6 is an x-ray diffraction pattern for a complex of sodium montmorillonite clay and ethylene vinyl alcohol polymer prepared according to Example 2.

As shown in FIG. 6, an x-ray diffraction pattern for the polymer-treated product shows, via the height and width of the peak at 13.98 Å, that the clay remains exfoliated and includes ethylene vinyl alcohol polymer attached to the clay inner platelet surfaces.

EXAMPLE 3 (FIG. 7)

I. Exfoliating Belle Yellow Sodium Bentonite (Gel A)
  A. Add 100 ml of water to a 2000 ml beaker, then using the Caframo mixer with a 2 inch diameter shearing blade, slowly add Belle Yellow (a teaspoonful at a time, appr. 5 g) and 5 g gamma-butyrolactone (GBL) to the water while mixing.
  B. Adjust mixing speed if necessary to maintain optimal shearing capacity because viscosity will increase as Belle Yellow being incorporated into water and GBL. The vortex should be about ⅓ way down into the beaker if possible.
  C. Allow the mixture to shear for 1 hour until it is completely homogenized.
  D. Run an X-ray scan of the gel to ensure exfoliation. (See FIG. 2).

II. Polymer+Nanocomposite
  A. Into a large stainless steel container, add gamma-butyrolactone (GBL), gel A (Belle Yellow+water), and ethylene vinyl alcohol polymer (EV-OH).
  B. Using a hot plate, heat the reactants to 110° C.
  C. While the reactants are heating, shear and mix the gel into the polymer via the Coules mixer.
  D. When polymer is 100% melted, increase the speed of mixer and allow reactants to shear for at least 3 hours, to evaporate the water.
  E. Stop reaction, pour products into trays and let cool overnight.
  F. Break product into tiny chunks of about 1–22 mm.
  G. Wash finished polymer by running hot water through it until there is no trace of GBL.
  H. Run tests. (TGA, X-rays, clarity by microscope)

NOTE: For higher percentages of clay in polymer, adjust ratio and incorporate corrected amount to reaction. For example, for a 10% concentration, use 100 g Belle Yellow and 900 g EV-OH. The amount of solvent to use at this time is variable. A ratio of 5% clay to 95% by weight water to make the gel is preferred. From that ratio, a 50:50 $H_2O$ to GBL is used, therefore, 1900 g of $H_2O$ and 1900 g GBL is used for the 10% concentration.

Figure 7:
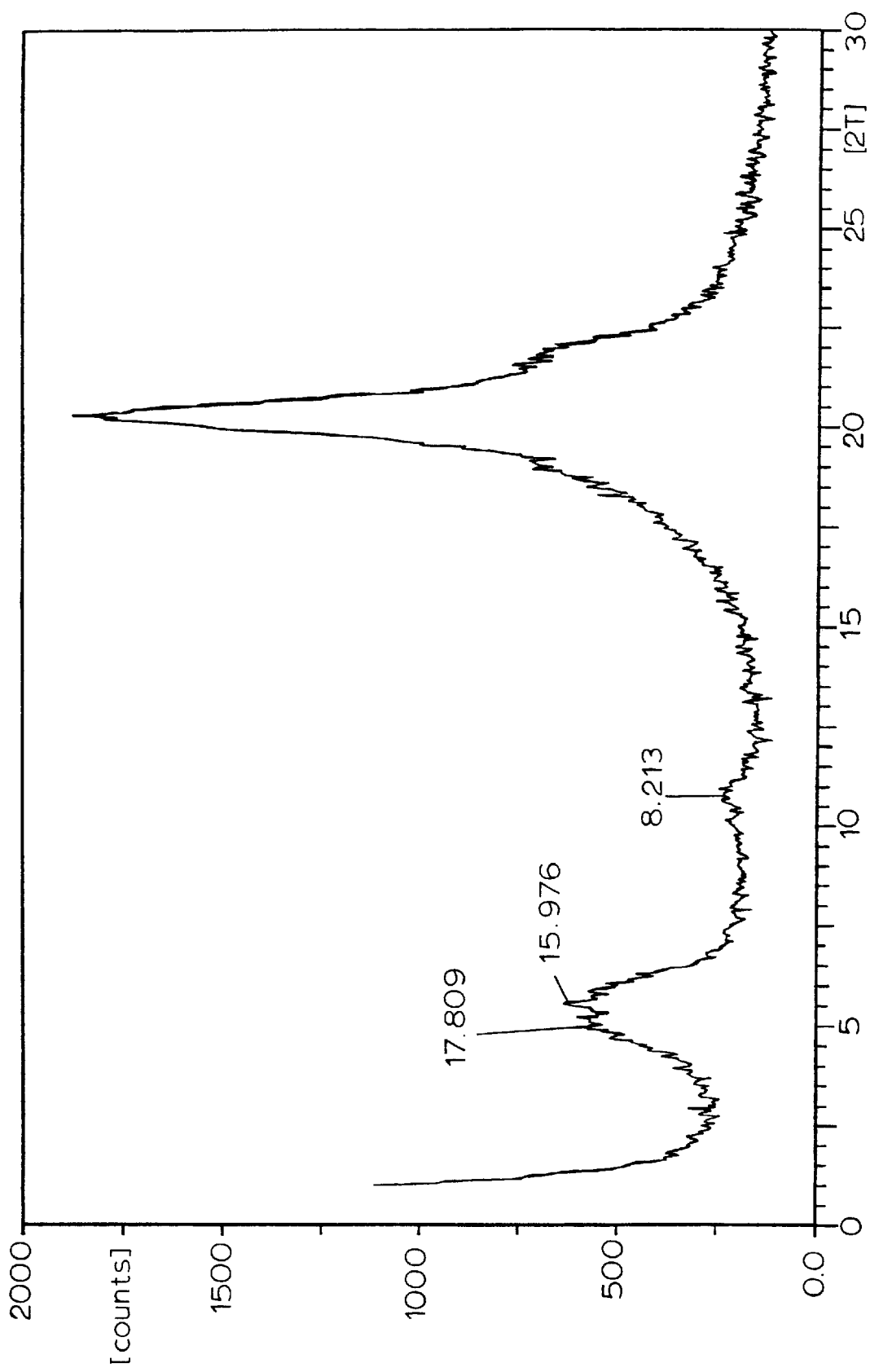
FIG. 7 is an x-ray diffraction pattern for a complex of sodium montmorillonite clay and ethylene vinyl alcohol polymer prepared according to Example 3.

As shown in FIG. 7, an x-ray diffraction patter for the polymer-treated product shows via the height and width of the peak at 15.976 Å, that the clay remains exfoliated and includes ethylene vinyl alcohol polymer attached to the clay inner platelet surfaces.

EXAMPLE 4 (FIG. 8)

Figure 8:
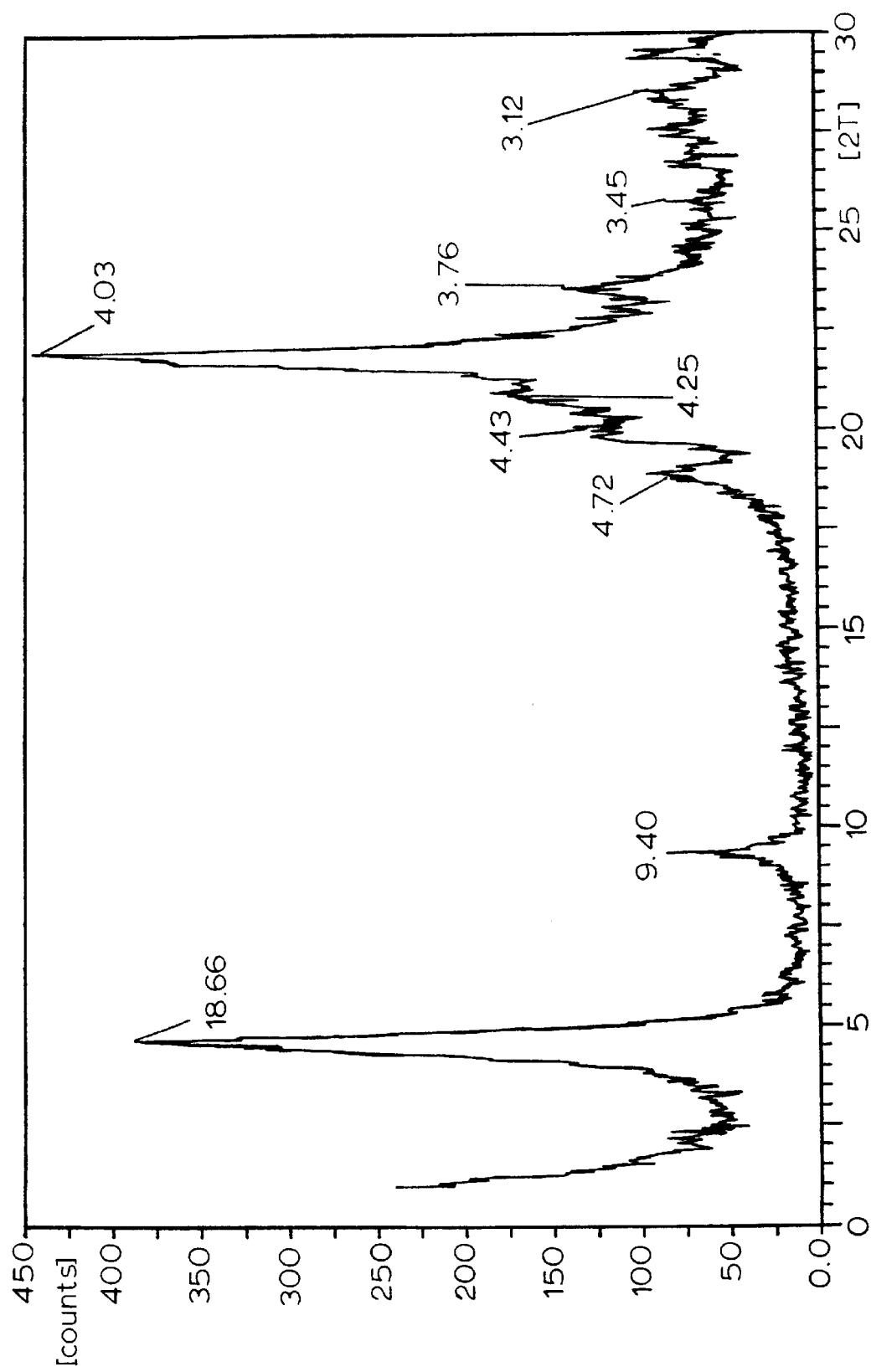
FIG. 8 is an x-ray diffraction pattern for a mixture of sodium montmorillonite clay and ethylene vinyl alcohol polymer prepared according to Example 4.

Example 2 was repeated without including the water (0% water), in exfoliating the clay to produce Gel A (using 70% by weight clay and 30% by weight DMSO, based on the dry weight of the clay). As shown in FIG. 8, the high, narrow peak at 18.66 Å is indicative of sodium bentonite clay that has not been exfoliated (or a sodium bentonite clay that was exfoliated and then collapsed back into the original multi-layered structure).

EXAMPLE 5 (FIG. 9)

Figure 9:
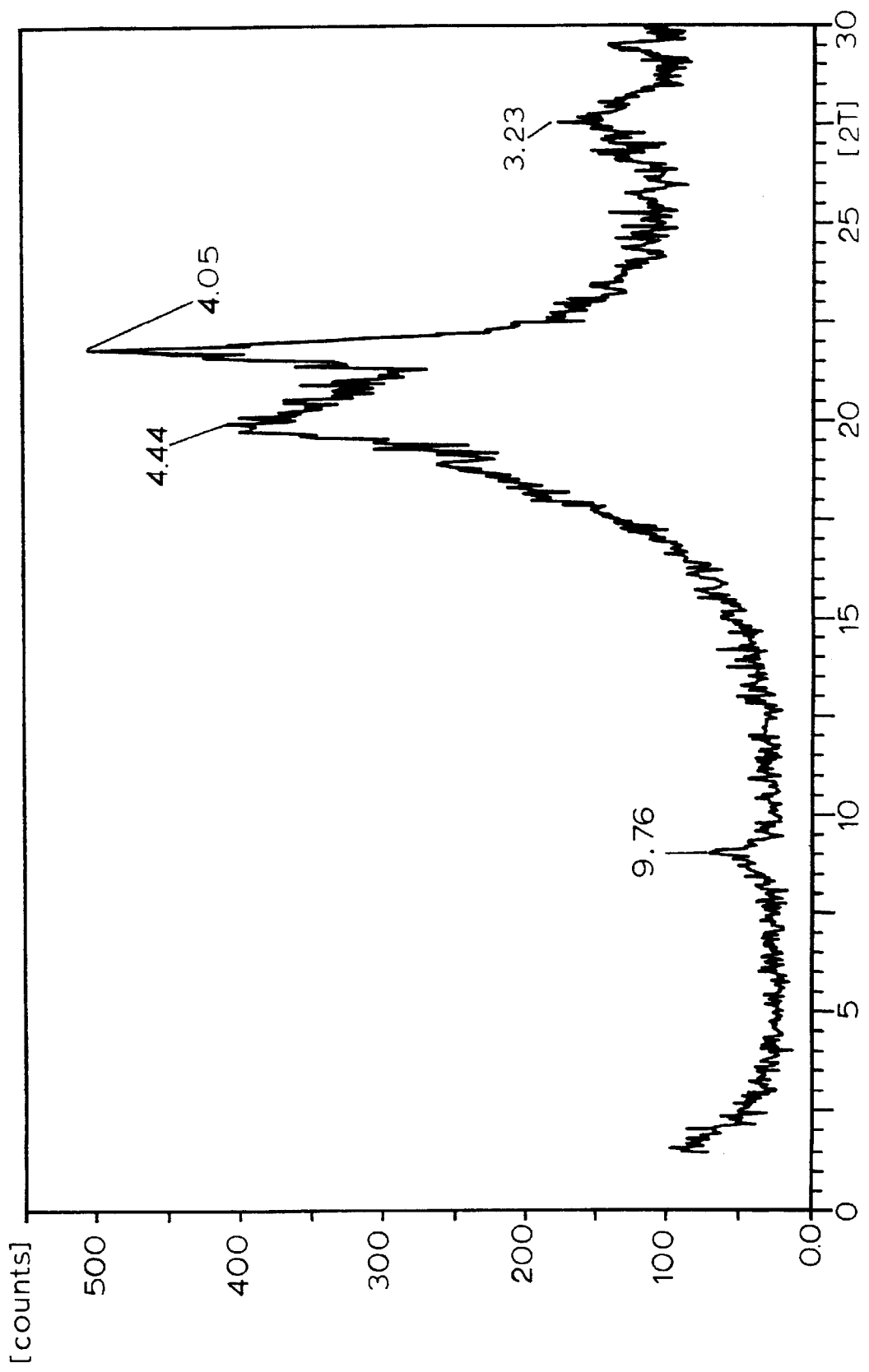
FIG. 9 is an x-ray diffraction pattern for a mixture of sodium montmorillonite clay and ethylene vinyl alcohol polymer prepared according to Example 5.

Example 2 was repeated without a solvent or water, attempting to intercalate the EVOH polymer melt directly between the clay platelets. As shown in FIG. 9, the clay was not intercalated (complexed with the EVOH polymer, and was not exfoliated.

EXAMPLE 6

I. Preparation of Gel A

|  | Initial Wt. % | Final Wt. % |
|---|---|---|
| H$_2$O-267 g | [19.06% total wt.] | [0% total wt.] |
| Gamma Butyrolactone (GBL) - 267g | [28.57% total wt.] | [46.88% total wt.] |
| Diglyme (DG) - 267 g | [28.57% total wt.] | [46.88% total wt.] |
| Sodium Bentonite (Belle Yellow) clay - 53.3 g | [3.80% total wt.] | [6.24% total wt.] |

Mix the H$_2$O, GBL and DG, then slowly add the Belle Yellow clay.
Mix until the clay is completely dispersed or exfoliated.
Mixture is a thixotropic gel and looks like grease.

II. Add solvent(s) Compatible with Water And Dehydration of Gel

Premix the following, then add under agitation to Gel A
GBL-133.3 g
DG-133.3 g

Mix until dispersed thoroughly.
Then under agitation added 280 g Methyl Ethyl Ketone (MEK) (About 20%–30% of the total weight of Gel A plus H$_2$O-compatible solvent(s)).
Apply heat 80–100° C. until dehydration of Gel A (until 0.5% moisture content, or below).
Keep mixture mixing at all times

III. Preparation of Nylon 6,6 with Gamma-butyrolactone (GBL) and Gel A

|  | Initial Wt. % | Final Wt. % |
|---|---|---|
| Nylon 6,6 - 10 g | [8.32% total wt.] | [85% total wt.] |
| Gamma-butyrolactone - 85 g | [70.75% total wt.] | [0% total wt.] |
| Gel A-25.14 g (for 15% Clay) | [20.93% total wt.] | [0% total wt.] |
| 7% Belle Yellow in gel A | [1.46% total wt.] | [15% total wt.] |

In a closed system, using a J-Flux bath, add all the Nylon 6,6, GBL and Gel A in a 150 ml beaker.
Begin heating and shearing the solution.
The closed system prevents the GBL from evaporating too quickly.
Continue under high shear until the Nylon 6,6 melts.
Then begin the timer.
Continue under high shear for three hours.
During these hours continually check the temperature (maintain above the melt temp. for Nylon 6,6).
Then after three hours open the system, to allow the water and solvent to evaporate.
Allow this mixture to shear for three hours.
The shear time depends on the rate of GBL evaporation.
Then let cool.

-continued

III. Preparation of Nylon 6,6 with Gamma-butyrolactone (GBL) and Gel A

|  | Initial Wt. % | Final Wt. % |
|---|---|---|

Wash with acetone, after the first wash the acetone will be a dark burnt orange or brown color.
Continue washing until the color is diminished greatly.
The used acetone should have a slight yellowish color when finished washing.
Allow to dry overnight.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A method of exfoliating platelets of a phyllosilicate material to form exfoliated platelets having a water-insoluble polymer or oligomer electrostatically complexed to one or both major surfaces of said platelets, comprising forming an intercalating composition comprising the phyllosilicate, water and an organic solvent having a functionality selected from the group consisting of an aromatic ring, carboxyl, carbonyl, hydroxyl, amide, ether, and ester, and shearing the intercalating composition to form a gel comprising the phyllosilicate platelets in a water/solvent mixture, wherein the organic solvent is bonded to a surface of the phyllosilicate platelets; dehydrating the gel to a water content of 10% by weight or less and then contacting the exfoliated phyllosilicate platelets with a composition comprising a water-insoluble polymer or oligomer and a solvent for said water-insoluble polymer or oligomer.

2. A method of forming a nanocomposite composition comprising exfoliating platelets of a phyllosilicate, in accordance with claim 1, and admixing the platelets with a matrix polymer.

3. The method of claim 1, wherein the solvent for the water-insoluble polymer or oligomer is the same as the solvent of the water/solvent mixture in which the phyllosilicate is exfoliated.

4. The method of claim 1, further including the step of adding a co-solvent with the water-insoluble polymer or oligomer and solvent for said water-insoluble polymer or oligomer.

5. The method of claim 4, wherein the co-solvent is selected from the group consisting of methyl ethyl ketone, gamma-butyrolactone, diglyme, and mixtures thereof.

6. The method of claim 5, wherein the mixture comprises a mixture of gamma-butyrolactone and diglyme.

7. The method of claim 1, wherein the amount of polymer or oligomer adhered to the exfoliated platelets is about 10% to about 80% by weight, based on the dry weight of the exfoliated platelets.

8. The method of claim 7, wherein the amount of polymer or oligomer adhered to the exfoliated platelets is about 15% to about 80% by weight, based on the dry weight of the exfoliated platelets.

9. The method of claim 8, wherein the amount of polymer or oligomer adhered to the exfoliated platelets is about 20% to about 70% by weight, based on the dry weight of the exfoliated platelets.

10. The method of claim 9, wherein the amount of polymer or oligomer adhered to the exfoliated platelets is about 20% to about 60% by weight, based on the dry weight of the exfoliated platelets.

11. The method of claim 8, wherein the amount of polymer or oligomer adhered to the exfoliated platelets is about 16% to about 80% by weight, based on the dry weight of the exfoliated platelets.

12. The method of claim 1, wherein the phyllosilicate is a smectite clay.

13. The method of claim 12, wherein the smectite clay is selected from the group consisting of sodium montmorillonite, and sodium bentonite.

14. The method in accordance with claim 1, wherein the concentration of water-insoluble polymer or oligomer in said phyllosilicate-contacting composition is at least about 5% by weight.

15. The method of claim 2, wherein the matrix polymer is selected from the group consisting of a polyamide: polyvinylimine; polyethylene terephthalate; polybutylene terephthalate; a polymer polymerized from a monomer selected from the group consisting of dihydroxyethyl terephthalate; hydroxyethyl terephthalate; dihydroxybutyl terephthalate; and mixtures thereof.

16. The methocd in accordance with claim 14, wherein the concentration of water-insoluble polymer or oligomer in said phyllosilicate-contacuing composition is at least about 20% by weight.

17. The method in accordance with claim 16, wherein the concentration of water-insoluble polymer or oligomer in said phyllosilicate-coniacting composition is at least about 30% by weight.

18. The method in accordaice with claim 17, wherein the concentration of water-insoluble polymer or oligomer in said phyllosilicate-contacting composition is in the range of about 50% to about 80% by weight.

19. The method in accordance with claim 17, wherein the concentration of water-insoluble polymer or oligomer in said phyllosilicate-contacting composition is in the range of about 50% to about 100% by weight.

20. The method in accordance with claim 1, wherein the concentration of water-insoluble polymer or oligomer in the phyllosilicate-contacting composition is at least 16% by weight, based on the dry weight of the phyllosilicate contacted.

21. The method in accordance with claim 20, wherein the concentration of polymer or oligomer in the phyllosilicate-contacting composition is in the range of about 16% to about 200% by weight, based on the dry weight of the phyllosilicate contacted.

22. The method in accordance with claim 21, wherein the concentration of the water-insoluble polymer or oligomer in the phyllosilicate-contacting composition is about 70% to about 200% by weight, based on the dry weight of the phyllosilicate contacted.

23. The method in accordance with claim 1, wherein the polymer or oligoiner has a weight average molecular weight in the range of about 225 to about 1,000.000.

24. The method in accordance with claim 23, wherein the polymer or oligomer has a weight average molecular weight in the range of about 225 to about 10,000.

25. The method of claim 1, wherein the phyllosilicate is exfoliated by forming an intercalating composition of the phyllosilicate, water, and said organic solvent, and shearing the intercalate composition to exfoliate the intercalate and form a gel containing the exfoliated platelets having the organic solvent bonded to a surface of the platelets, prior to contacting the exfoliated platelets with the water-insoluble polymer or oligomer.

26. The method of claim 1, wherein the gel is dehydrated by removing water in an amount sufficient to form an azeotrope of the water/solvent mixture.

27. The method of claim 1, wherein said polymer solvent comprises about 50% to about 200% by weight organic solvent, based on the total weight of said composition contacting said phyllosilicate.

28. The method of claim 1, wherein the water-insoluble polymer has a functionality selected from the group consisting of a carbonyl, hydroxyl, carboxyl, amine, amide, ether, ester, sulfate, sulfonate, sulfinate, sulfamate, phosphate, phosphonate, phosphinate, and an aromatic ring.

29. The method of claim 1, wherein the intercalating composition comprises water in an amount of at least about 4% by weight based on the dry weight of the phyllosilicate, and the organic solvent portion of the intercalating composition comprises at least about 2% by weight. based on the dry weight of the phyllosilicate.

30. The method of claim 1, wherein the gel is dehydrated to a water content of about 1% or less, based on the dry weight of the phyllosilicate.

31. The method of clain 30, wherein the gel is dehydrated to a water content of about 0.5% or less. based on the dry weight of the phyllosilicate.

32. The method of claim 29, wherein the amount of water in the intercalating composition comprises about 4% to about 100% by weight, based on the dry weight of the phyllosilicate.

33. The method of claim 32, wherein the amount of organic solvent in the intercalating composition comprises about 5% to about 100% by weight, based on the dry weight of the phyllosilicate.

34. The method of claim 1,wherein the organic solvent has a boiling point above about 75° C.

* * * * *

UNITED STATES PATENT AND TRADEMARK OFFICE
CERTIFICATE OF CORRECTION

PATENT NO. : 6,228,903 B1
DATED : May 8, 2001
INVENTOR(S) : Beall et al.

It is certified that error appears in the above-identified patent and that said Letters Patent is hereby corrected as shown below:

<u>Title page,</u>
Related U.S. Application Data, last line, replace "5,698,624" with -- 5,598,624 --.

<u>Column 23,</u>
Line 27, replace "contacving" with -- contacting --
Line 31, replace "coniacting" with -- contacting --.

Signed and Sealed this

Twenty-third Day of April, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,228,903 B1
DATED : May 8, 2001
INVENTOR(S) : Beall et al.

It is certified that error appears in the above-identified patent and that said Letters Patent is hereby corrected as shown below:

<u>Title page,</u>
Item [63], Related U.S. Application Data, last line, replace "5,598,624" with -- 5,698,624 --.

Signed and Sealed this

Twenty-ninth Day of October, 2002

*Attest:*

*Attesting Officer*

JAMES E. ROGAN
*Director of the United States Patent and Trademark Office*